US008073892B2

(12) United States Patent
Feghali et al.

(10) Patent No.: US 8,073,892 B2
(45) Date of Patent: Dec. 6, 2011

(54) CRYPTOGRAPHIC SYSTEM, METHOD AND MULTIPLIER

(75) Inventors: Wajdi K. Feghali, Boston, MA (US); William C. Hasenplaugh, Jamaica Plain, MA (US); Gilbert M. Wolrich, Framingham, MA (US); Daniel R. Cutter, Maynard, MA (US); Vinodh Gopal, Westboro, MA (US); Gunnar Gaubatz, Worcester, MA (US)

(73) Assignee: Intel Corporation, Santa Clara, CA (US)

( * ) Notice: Subject to any disclaimer, the term of this patent is extended or adjusted under 35 U.S.C. 154(b) by 1102 days.

(21) Appl. No.: 11/323,994

(22) Filed: Dec. 30, 2005

(65) Prior Publication Data

US 2011/0264720 A1    Oct. 27, 2011

(51) Int. Cl.
 *G06F 7/52* (2006.01)
(52) U.S. Cl. .................... 708/631; 708/603; 708/627
(58) Field of Classification Search .......... 708/400, 708/490–492, 500–503, 625–629; 364/728, 364/750–760
See application file for complete search history.

(56) References Cited

U.S. PATENT DOCUMENTS

| | | | | |
|---|---|---|---|---|
| 3,515,344 A | * | 6/1970 | Goldschmidt et al. | 708/708 |
| 4,546,446 A | * | 10/1985 | Machida | 708/627 |
| 4,594,679 A | * | 6/1986 | George et al. | 708/503 |
| 4,775,951 A | * | 10/1988 | Iwahashi et al. | 708/422 |
| 4,811,269 A | | 3/1989 | Hirose et al. | |
| 5,073,870 A | * | 12/1991 | Morita | 708/491 |
| 5,150,322 A | * | 9/1992 | Smith et al. | 708/628 |
| 5,524,090 A | * | 6/1996 | Iwamura | 708/625 |
| 5,892,699 A | * | 4/1999 | Duncan et al. | 708/628 |
| 6,035,316 A | * | 3/2000 | Peleg et al. | 708/523 |
| 6,182,233 B1 | * | 1/2001 | Schuster et al. | 713/400 |
| 6,711,602 B1 | * | 3/2004 | Bhandal et al. | 708/625 |
| 7,266,580 B2 | * | 9/2007 | Busaba et al. | 708/625 |

(Continued)

FOREIGN PATENT DOCUMENTS

CN     1410880 A     4/2003

(Continued)

OTHER PUBLICATIONS

Analysis of Sliding Window Techniques for Exponentiation, C. Koc, 1995, 17-24.*

(Continued)

*Primary Examiner* — Lewis Bullock, Jr.
*Assistant Examiner* — Kevin G Hughes
(74) *Attorney, Agent, or Firm* — Grossman, Tucker, Perreault & Pfleger PLLC

(57) ABSTRACT

In general, in one aspect, the disclosure describes a multiplier that includes a set of multiple multipliers configured in parallel where the set of multiple multipliers have access to a first operand and a second operand to multiply, the first operand having multiple segments and the second operand having multiple segments. The multiplier also includes logic to repeatedly supply a single segment of the second operand to each multiplier of the set of multiple multipliers and to supply multiple respective segments of the first operand to the respective ones of the set of multiple multipliers until each segment of the second operand has been supplied with each segment of the first operand. The logic shifts the output of different ones of the set of multiple multipliers based, at least in part, on the position of the respective segments within the first operand. The multiplier also includes an accumulator coupled to the logic.

32 Claims, 23 Drawing Sheets

U.S. PATENT DOCUMENTS

| | | | |
|---|---|---|---|
| 7,373,368 B1 * | 5/2008 | Rarick et al. | 708/492 |
| 2003/0065699 A1 * | 4/2003 | Burns | 708/625 |
| 2005/0138366 A1 | 6/2005 | Burres et al. | |
| 2005/0138368 A1 | 6/2005 | Burres et al. | |
| 2005/0141715 A1 | 6/2005 | Chen-Chi et al. | |
| 2005/0144211 A1 * | 6/2005 | Simkins et al. | 708/490 |
| 2005/0149725 A1 | 7/2005 | Burres et al. | |
| 2005/0149744 A1 | 7/2005 | Burres et al. | |
| 2005/0154960 A1 | 7/2005 | Koshy et al. | |
| 2005/0198093 A1 * | 9/2005 | Son | 708/625 |
| 2005/0238166 A1 | 10/2005 | Koshy et al. | |
| 2005/0240764 A1 | 10/2005 | Koshy et al. | |
| 2006/0010327 A1 | 1/2006 | Koshy et al. | |
| 2006/0059219 A1 | 3/2006 | Koshy | |
| 2006/0059220 A1 | 3/2006 | Koshy et al. | |
| 2007/0061392 A1 * | 3/2007 | Gerwig et al. | 708/523 |
| 2009/0037508 A1 * | 2/2009 | Bernard et al. | 708/521 |

FOREIGN PATENT DOCUMENTS

| | | |
|---|---|---|
| JP | 04216126 A | 8/1992 |
| WO | 2007078939 A3 | 7/2007 |
| WO | WO 2007/078939 | 11/2007 |

OTHER PUBLICATIONS

Modular Exponentiation using Parallel Multipliers, S. Tang, 2003, 1-8.*

Optimized Squaring with Sliding Windows, B. Phillips and N. Burgess, 2000, 130-133.*

Improved Approach to the Use of Booth's Multiplication Algorithm, Apr. 1, 1985, IBM Technical Disclosure Bulletin, vol. 27 Issue 11, pp. 6624-6632.*

Erle, et al.: Decimal Multiplication with Efficient Partial Product Generation, Proceedings of the 17th IEEE Symposium on Computer Arithmetic (ARITH'05); 2005; 8 pages.

Feghali, et al.: Security: Adding Protection to the Network via the Network Processor, Intel Technology Journal, vol. 06, No. 3; Aug. 15, 2002; ISSN 1535766X; 10 pages.

Halbutogullari, et al.: Parallel Multiplication in GF (2k) Using Polynomial Residue Arithmetic, Designs, Codes and Cryptography, vol. 20, No. 2; pp. 155-173; Jun. 2000; 15 pages.

Harris, et al.: An Improved Unified Scalable Radix-2 Montgomery Multiplier, Proceedings of the 17th IEEE Symposium on Computer Arithmetic (ARITH'05); 2005; 8 pages.

Walters, III, et al.: Efficient Function Approximation Using Truncated Multipliers and Squarers, Proceedings of the 17th IEEE Symposium on Computer Arithmetic (ARITH'05); 2005; 8 pages.

Dadda L., et al., "Digital Multipliers: A Unified Approach", Alta Frequenza, Ufficio Centrale AEI-CEI, Milano IT., vol. 37, No. 11, Nov. 11, 1968, XP007901375, pp. 1079-1086.

International Search Report and Written Opinion, International Application No. PCT/US2006/048417, mailed Aug. 8, 2007, 31 pages.

International Search Report and written opinion for PCT Patent Application No. PCT/US2006/048417, mailed on Aug. 21, 2007, pp. 31.

Office Action received for CN Patent Application No. 200610130999.7 mailed on Mar. 6, 2009, pp. 6 and English translation of 12 pages.

International Preliminary Report on Patentability for PCT Patent Application No. PCT/US2006/048417, mailed on Jul. 10, 2008, 8 Pages.

Office Action received for Chinese Patent Application No. 200610130999.7, mailed on Mar. 15, 2010, 8 pages of Office Action and English translation of 13 pages.

Office Action received for European Patent Application No. 06845803.3, mailed on Jul. 16, 2009, 2 Pages.

* cited by examiner

CRYPTOGRAPHIC SYSTEM, METHOD AND MULTIPLIER

REFERENCE TO RELATED APPLICATIONS

This relates to co-pending U.S. patent application Ser. No. 11/323,329, filed on the same day as the present application, and entitled SECURITY MODULE ARCHITECTURE FOR PUBLIC AND/OR PRIVATE KEY ENCRYPTION.

This relates to co-pending U.S. patent application Ser. No. 11/323,993, filed on the same day as the present application, and entitled SYSTEM AND METHOD FOR CRYPTOGRAPHY PROCESSING UNITS AND MULTIPLIER.

BACKGROUND

Cryptography can protect data from unwanted access. Cryptography typically involves mathematical operations on data (encryption) that makes the original data (plaintext) unintelligible (ciphertext). Reverse mathematical operations (decryption) restore the original data from the ciphertext. Typically, decryption relies on additional data such as a cryptographic key. A cryptographic key is data that controls how a cryptography algorithm processes the plaintext. In other words, different keys generally cause the same algorithm to output different ciphertext for the same plaintext. Absent a needed decryption key, restoring the original data is, at best, an extremely time consuming mathematical challenge.

Cryptography is used in a variety of situations. For example, a document on a computer may be encrypted so that only authorized users of the document can decrypt and access the document's contents. Similarly, cryptography is often used to encrypt the contents of packets traveling across a public network. While malicious users may intercept these packets, these malicious users access only the ciphertext rather than the plaintext being protected.

Cryptography covers a wide variety of applications beyond encrypting and decrypting data. For example, cryptography is often used in authentication (i.e., reliably determining the identity of a communicating agent), the generation of digital signatures, and so forth.

Current cryptographic techniques rely heavily on intensive mathematical operations. For example, many schemes involve the multiplication of very large numbers. For instance, many schemes use a type of modular arithmetic known as modular exponentiation which involves raising a large number to some power and reducing it with respect to a modulus (i.e., the remainder when divided by given modulus). The mathematical operations required by cryptographic schemes can consume considerable processor resources. For example, a processor of a networked computer participating in a secure connection may devote a significant portion of its computation power on encryption and decryption tasks, leaving less processor resources for other operations.

DETAILED DESCRIPTION

Figure 1:
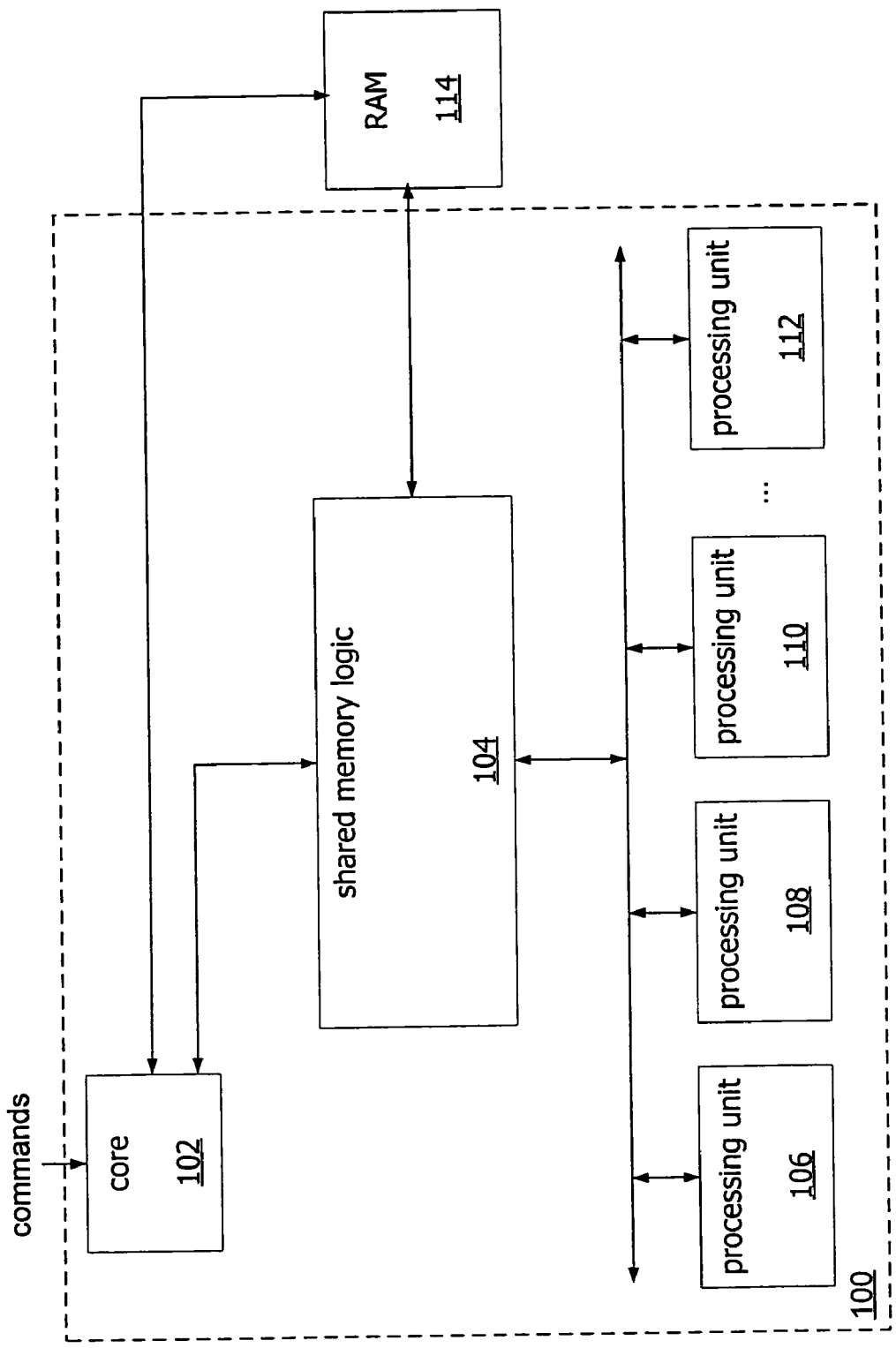
FIG. 1 is a diagram of a cryptographic component.

FIG. 1 depicts a sample implementation of a system component 100 to perform cryptographic operations. The component 100 can be integrated into a variety of systems. For example, the component 100 can be integrated within the die of a processor or found within a processor chipset. The system component 100 can off-load a variety of cryptographic operations from other system processor(s). The component 100 provides high performance at relatively modest clock speeds and is area efficient.

As shown, the sample component 100 may be integrated on a single die that includes multiple processing units 106-112 coupled to shared memory logic 104. The shared memory logic 104 includes memory that can act as a staging area for data and control structures being operated on by the different processing units 106-112. For example, data may be stored in memory and then sent to different processing units 106-112 in turn, with each processing unit performing some task involved in cryptographic operations and returning the, potentially, transformed data back to the shared memory logic 104.

The processing units 106-112 are constructed to perform different operations involved in cryptography such as encryption, decryption, authentication, and key generation. For example, processing unit 106 may perform hashing algorithms (e.g., MD5 (Message Digest 5) and/or SHA (Secure Hash Algorithm)) while processing unit 110 performs cipher operations (e.g., DES (Data Encryption Standard), 3DES (Triple DES), AES (Advanced Encryption Standard), RC4 (ARCFOUR), and/or Kasumi).

As shown, the shared memory logic 104 is also coupled to a RAM (random access memory) 114. In operation, data can be transferred from the RAM 114 for processing by the processing units 106-112. Potentially, transformed data (e.g., encrypted or decrypted data) is returned to the RAM 114. Thus, the RAM 114 may represent a nexus between the component 100 and other system components (e.g., processor cores requesting cryptographic operations on data in RAM 114). The RAM 114 may be external to the die hosting the component 100.

The sample implementation shown includes a programmable processor core 102 that controls operation of the component 100. As shown, the core 102 receives commands to perform cryptographic operations on data. Such commands can identify the requesting agent (e.g., core), a specific set of operations to perform (e.g., cryptographic protocol), the data to operate on (e.g., the location of a packet payload), and additional cryptographic context data such as a cryptographic key, initial vector, and/or residue from a previous cryptographic operation. In response to a command, the core 102 can execute program instructions that transfer data between RAM 114, shared memory, and the processing units 106-112.

Figure 2:
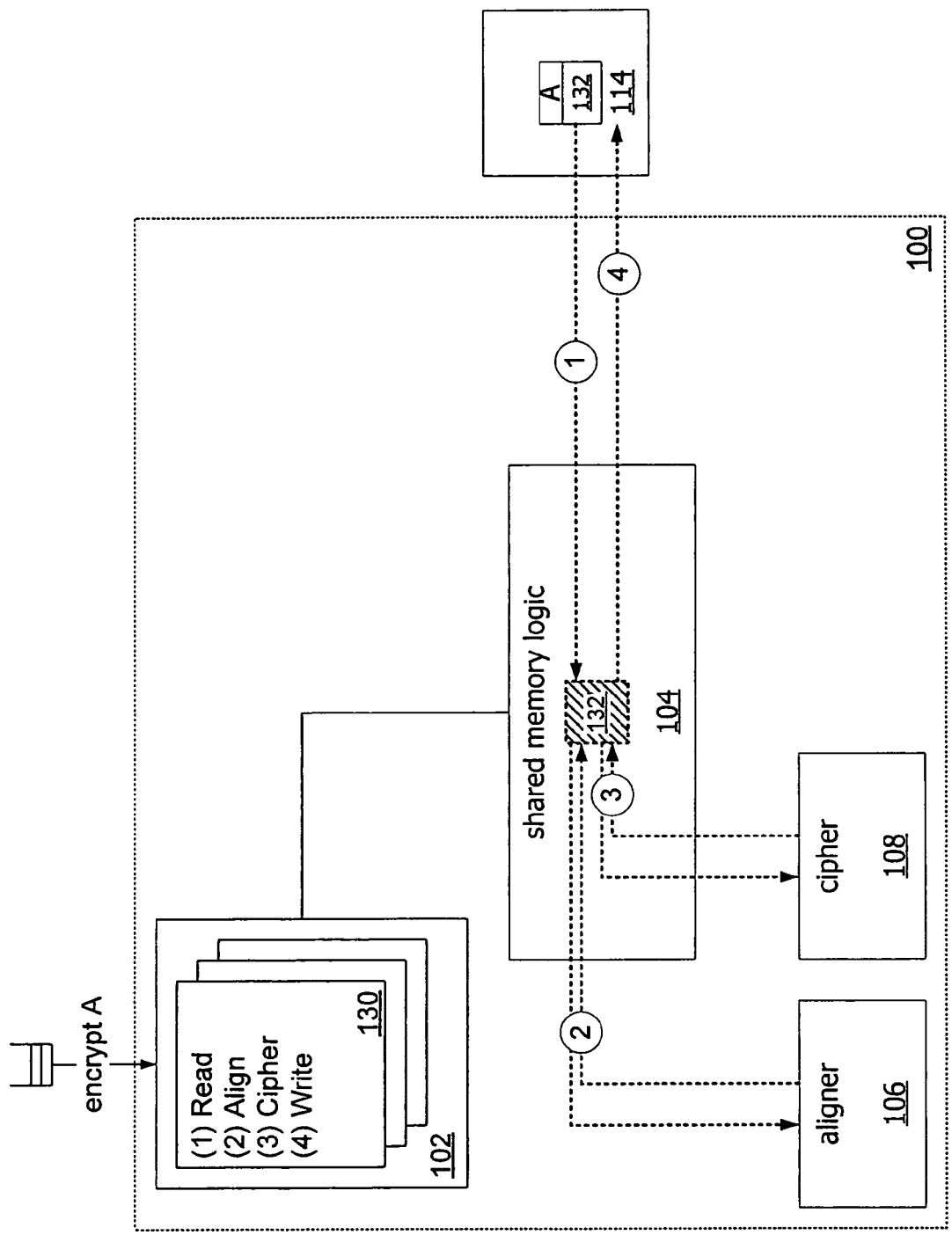
FIG. 2 is a flow diagram illustrating operation of a cryptographic component.

A program executed by the core 102 can perform a requested cryptographic operation in a single pass through program code. As an example, FIG. 2 illustrates processing of a command to encrypt packet "A" stored in RAM 114 by a program executed by core 102. For instance, another processor core (not shown) may send the command to component 100 to prepare transmission of packet "A" across a public network. As shown, the sample program: (1) reads the packet and any associated cryptography context (e.g., keys, initial vectors, or residue) into shared memory from RAM 114; (2) sends the data to an aligning processing unit 106 that writes the data back into shared memory 114 aligned on a specified byte boundary; (3) sends the data to a cipher processing unit 108 that performs a transformative cipher operation on the data before sending the transformed data to memory 104; and (4) transfers the transformed data to RAM 114. The core 102 may then generate a signal or message notifying the processor core that issued the command that encryption is complete.

The processor core 102 may be a multi-threaded processor core including storage for multiple program counters and contexts associated with multiple, respective, threads of program execution. That is, in FIG. 2, thread 130 may be one of multiple threads. The core 102 may switch between thread contexts to mask latency associated with processing unit 106-112 operation. For example, thread 130 may include an instruction (not shown) explicitly relinquishing thread 130 execution after an instruction sending data to the cipher processing unit 108 until receiving an indication that the transformed data has been written into shared memory 104. Alternately, the core 102 may use pre-emptive context switching that automatically switches contexts after certain events (e.g., requesting operation of a processing unit 106-112 or after a certain amount of execution time). Thread switching enables a different thread to perform other operations such as processing of a different packet in what would otherwise be wasted core 102 cycles. Throughput can be potentially be increased by adding additional contexts to the core 102. In a multi-threaded implementation, threads can be assigned to commands in a variety of ways, for example, by a dispatcher thread that assigns threads to commands or by threads dequeuing commands when the threads are available.

Figure 3:
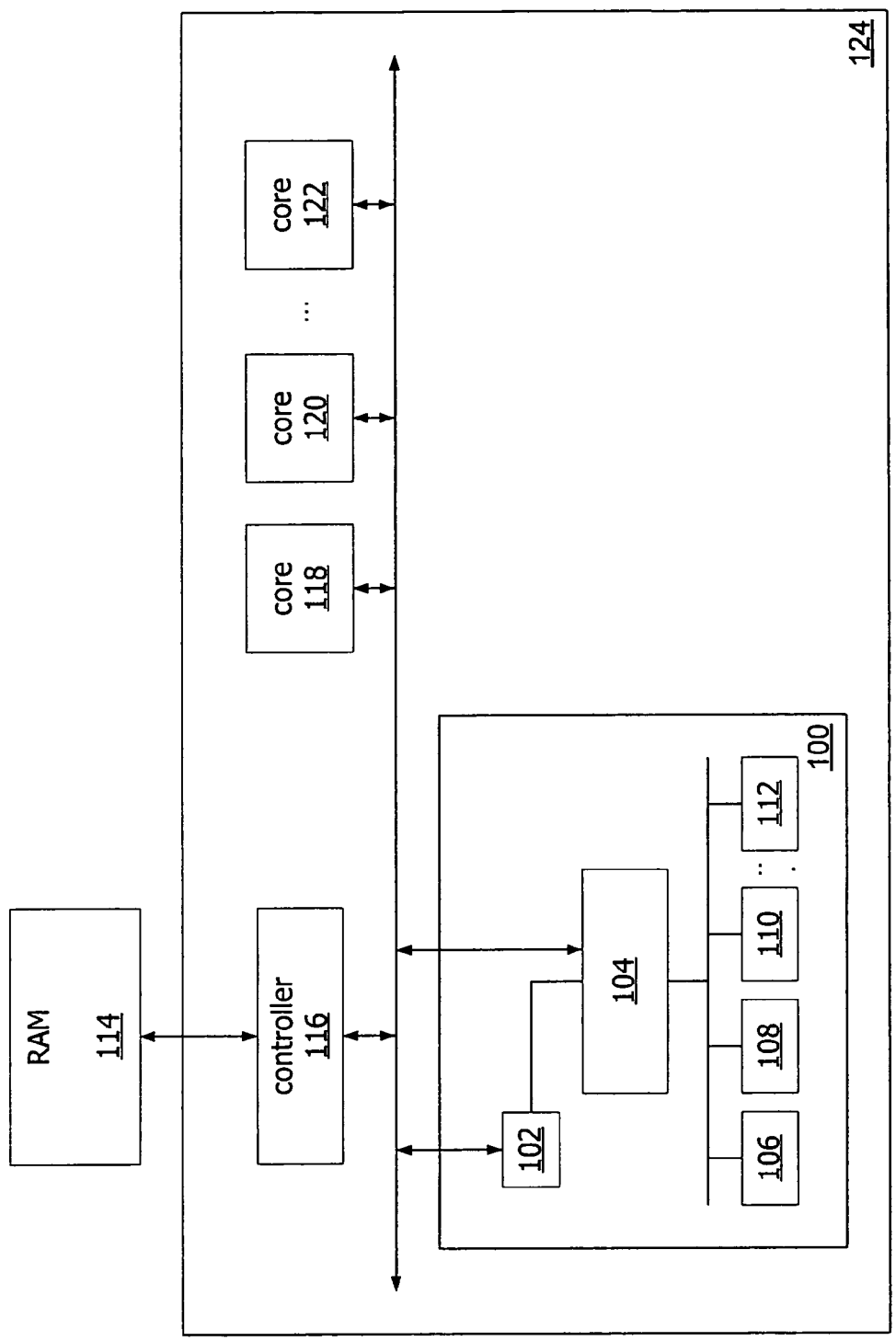
FIG. 3 is a diagram of a processor including a cryptographic component.

FIG. 3 illustrates a sample implementation of a processor 124 including a cryptographic system component 100. As shown, the component 100 receives commands from processor core(s) 118-122. In this sample implementation, core 102 is integrated into the system component 100 and services commands from the other cores 118-122. In an alternate implementation, processing core 102 may not be integrated within the component. Instead cores 118-122 may have direct control over component 100 operation. Alternately, one of cores 118-122, may be designated for controlling the cryptographic component 100 and servicing requests received from the other cores 118-122. This latter approach can lessen the expense and die footprint of the component 100.

Figure 4:
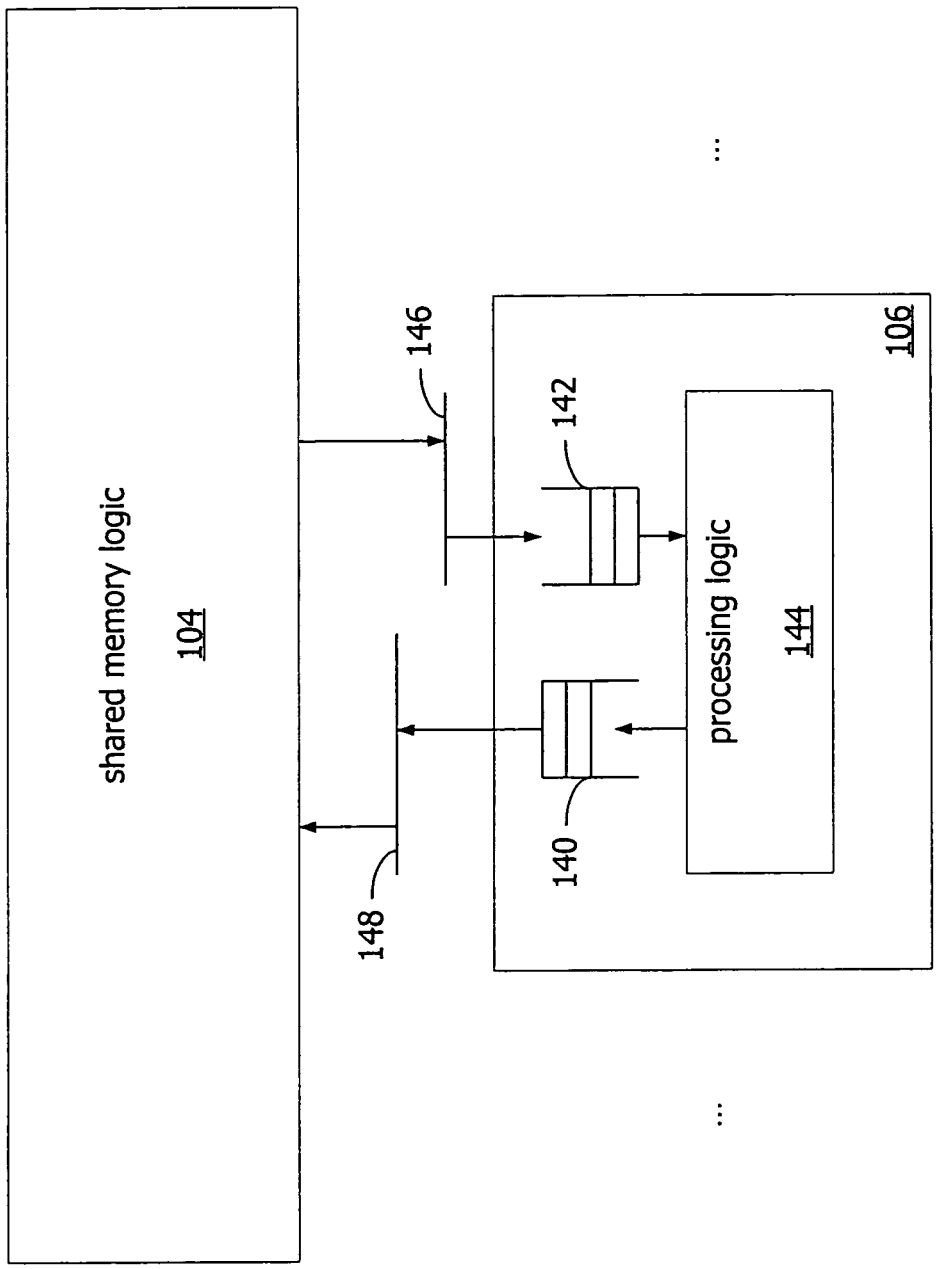
FIG. 4 is a diagram illustrating processing unit architecture.

As shown in FIG. 4, the different processing units 106-112 may feature the same uniform interface architecture to the shared memory logic 104. This uniformity eases the task of programming by making interaction with each processing unit very similar. The interface architecture also enables the set of processing units 106-112 included within the component 100 to be easily configured. For example, to increase throughput, a component 100 can be configured to include multiple copies of the same processing unit. For instance, if the component 100 is likely to be included in a system that will perform a large volume of authentication operations, the component 100 may be equipped with multiple hash processing units. Additionally, the architecture enables new processing units to be easily integrated into the component 100. For example, when a new cryptography algorithm emerges, a processing unit to implement the algorithm can be made available.

In the specific implementation shown in FIG. 4, each processing unit includes an input buffer 142 that receives data from shared memory logic 104 and an output buffer 140 that stores data to transfer to shared memory logic 104. The processing unit 106 also includes processing logic 144 such as programmable or dedicated hardware (e.g., an Application Specific Integrated Circuit (ASIC)) to operate on data received by input buffer 142 and write operation results to buffer 140. In the example shown, buffers 140, 142 may include memory and logic (not shown) that queue data in the buffers based on the order in which data is received. For example, the logic may feature head and tail pointers into the memory and may append newly received data to the tail.

In the sample implementation shown, the input buffer 140 is coupled to the shared memory logic 104 by a different bus 146 than the bus 148 coupling the output buffer 140 to the shared memory logic 104. These buses 146, 148 may be independently clocked with respect to other system clocks. Additionally, the buses 146, 148 may be private to component 100, shielding internal operation of the component 100. Potentially, the input buffers 140 of multiple processing units may share the same bus 146; likewise for the output buffers 140, 148. Of course, a variety of other communication schemes may be implemented such as a single shared bus instead of dual-buses or dedicated connections between the shared memory logic 104 and the processing units 106-112.

Generally, each processing unit is affected by at least two commands received by the shared memory logic 104: (1) a processing unit READ command that transfers data from the shared memory logic 104 to the processing unit input buffer 142; and (2) a processing unit WRITE command that transfers data from the output buffer 140 of the processing unit to the shared memory logic 104. Both commands can identify the target processing unit and the data being transferred. The uniformity of these instructions across different processing units can ease component 100 programming. In the specific implementation shown, a processing unit READ instruction causes a data push from shared memory to a respective target processing unit's 106-112 input buffer 142 via bus 146, while a processing unit WRITE instruction causes a data pull from a target processing unit's 106-112 output buffer 140 into shared memory via bus 148. Thus, to process data, a core 102 program may issue a command to first push data to the processing unit and later issue a command to pull the results written into the processing unit's output buffer 144. Of course, a wide variety of other inter-component 100 communication schemes may be used.

Figure 5:
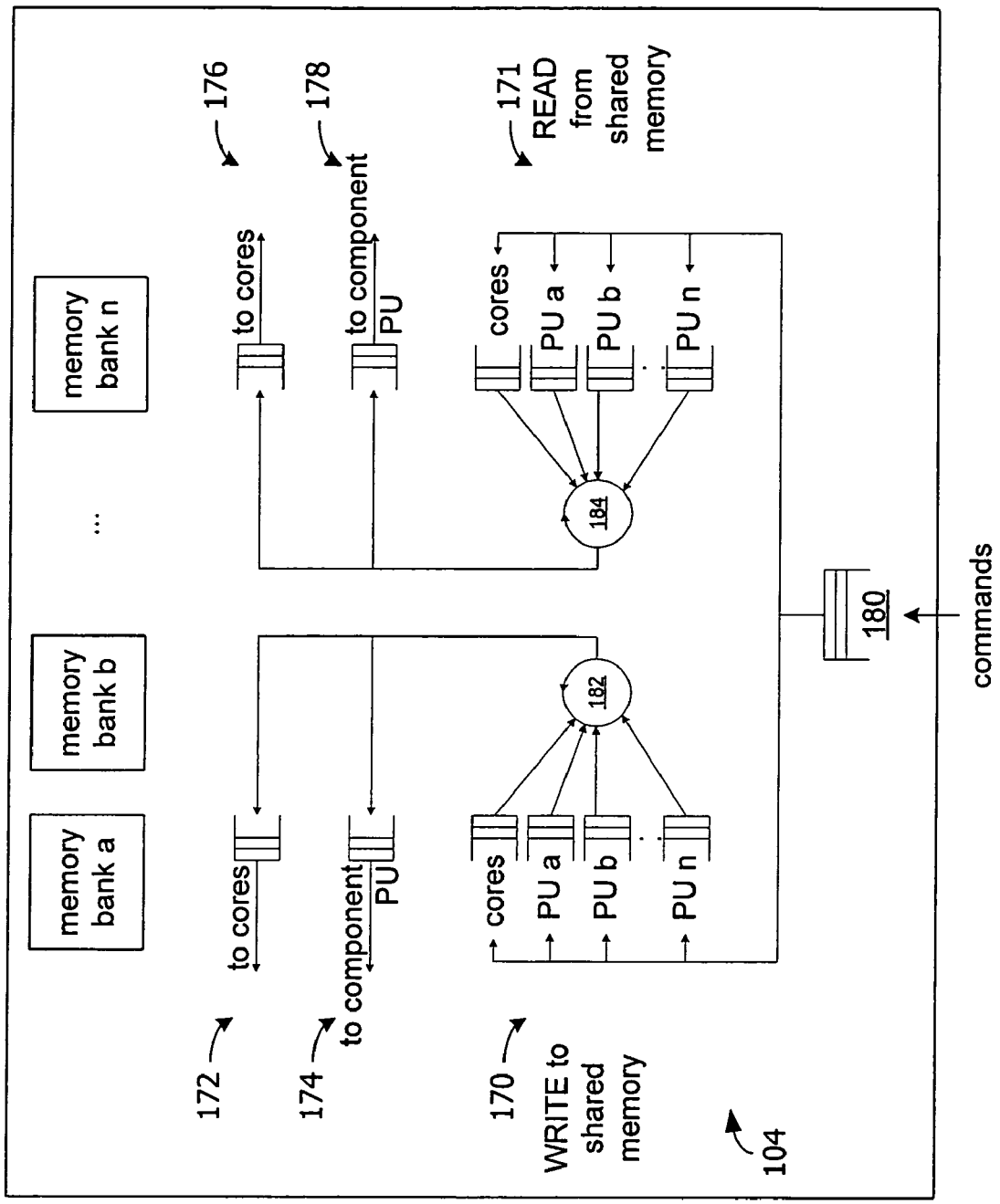
FIG. 5 is a diagram of logic interconnecting shared memory and the processing units.

FIG. 5 depicts shared memory logic 104 of the sample implementation. As shown, the logic 104 includes a READ queue and a WRITE queue for each processing unit (labeled "PU"). Commands to transfer data to/from the banks of shared memory (banks a-n) are received at an inlet queue 180 and sorted into the queues 170-171 based on the target processing unit and the type of command (e.g., READ or WRITE). In addition to commands targeting processing units, the logic 104 also permits cores external to the component 100 (e.g., cores 118-122) to READ (e.g., pull) or WRITE (e.g., push) data from/to the memory banks and features an additional pair of queues (labeled "cores") for these commands. Arbiters 182-184 dequeue commands from the queues 170-171. For example, each arbiter 182-184 may use a round robin or other servicing scheme. The arbiters 182-184 forward the commands to another queue 172-178 based on the type of command. For example, commands pushing data to an external core are enqueued in queue 176 while commands pulling data from an external core enqueued in queue 172. Similarly, commands pushing data to a processing unit are enqueued in queue 178 while commands pulling data from a processing unit are enqueued in queue 174. When a command reaches the head of a queue, the logic 104 initiates a transfer of data/to from the memory banks to the processing unit using buses 146 or 148 as appropriate or by sending/receiving data by a bus coupling the component 100 to the cores 118-122. The logic 104 also includes circuitry to permit transfer (push and pulls) of data between the memory banks and the external RAM 114.

The logic 104 shown in FIG. 5 is merely an example, and a wide variety of other architectures may be used. For example, an implementation need not sort the commands into per processing unit queues, although this queuing can ensure fairness among request. Additionally, the architecture reflected in FIG. 5 could be turned on its head. That is, instead of the logic 104 receiving commands that deliver and retrieve data to/from the memory banks, commands may be routed to the processing units which in turn issue requests to access the shared memory banks.

Figure 6:
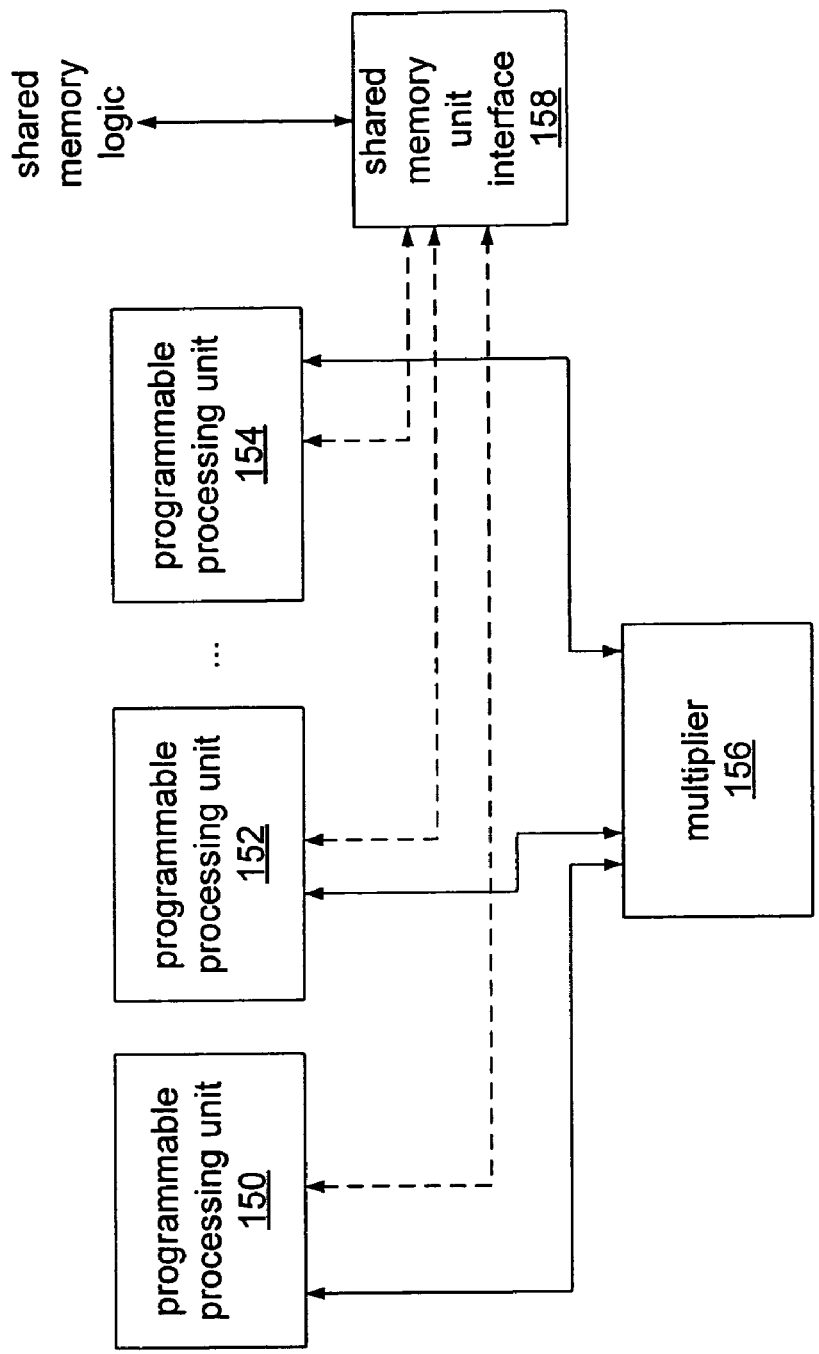
FIG. 6 is a diagram of a set of processing units coupled to a multiplier.

Many cryptographic protocols, such as public-key exchange protocols, require modular multiplication (e.g., [A×B] mod m) and/or modular exponentiation (e.g., A^exponent mod m) of very large numbers. While computationally expensive, these operations are critical to many secure protocols such as a Diffie-Helman exchange, DSA signatures, RSA signatures, and RSA encryption/decryption. FIG. 6 depicts a dedicated hardware multiplier 156 coupled to multiple processing units 150-154. The processing units 150-154 can send data (e.g., a pair of variable length multi-word vector operands) to the multiplier 156 and can consume the results. To multiply very large numbers, the processing units 150-154 can decompose a multiplication into a set of smaller partial products that can be more efficiently performed by the multiplier 156. For example, multiplication of two 1024-bit operands can be computed as four sets of 512-bit×512 bit multiplications or sixteen sets of 256-bit×256-bit multiplications.

The most efficient use of the multiplier 156 may vary depending on the problem at hand (e.g., the size of the operands). To provide flexibility in how the processing units 150-154 use the multiplier 156, the processing units 150-154 shown in FIG. 6 may be programmable. The programs may be dynamically downloaded to the processing units 150-154, along with data to operate on, from the shared memory logic 104 via interface 158. The program selected for download to a given processing unit 150-154 can change in accordance with the problem assigned to the processing unit 150-154 (e.g., a particular protocol and/or operand size). The programmability of the units 150-154 permits component 100 operation to change as new security protocols, algorithms, and implementations are introduced. In addition, a programmer can carefully tailor processing unit 150-154 operation based on the specific algorithm and operand size required by a protocol. Since the processing units 150-154 can be dynamically reprogrammed on the fly (during operation of the component 100), the same processing units 150-154 can be used to perform operations for different protocols/protocol options by simply downloading the appropriate software instructions.

As described above, each processing unit 150-154 may feature an input buffer and an output buffer (see FIG. 4) to communicate with shared memory logic 104. The multiplier 156 and processing units 150-154 may communicate using these buffers. For example, a processing unit 150-154 may store operands to multiply in a pair of output queues in the output buffer for consumption by the multiplier 156. The multiplier 156 results may be then transferred to the processing unit 150-154 upon completion. The same processing unit 150-154 input and output buffers may also be used to communicate with shared memory logic 104. For example, the input buffer of a processing unit 150-154 may receive program instructions and operands from shared memory logic 104. The processing unit 150-154 may similarly store the results of program execution in an output buffer for transfer to the shared memory logic 104 upon completion of program execution.

To coordinate these different uses of a processing unit's input/output buffers, the processing units 150-154 provide multiple modes of operation that can be selected by program instructions executed by the processing units. For example, in "I/O" mode, the buffers of programming unit 150-154 exclusively exchange data with shared memory logic unit 104 via interface 158. In "run" mode, the buffers of the unit 150-154 exclusively exchange data with multiplier 156 instead. Additional processing unit logic (not shown), may interact with the interface 158 and the multiplier 156 to indicate the processing unit's current mode.

As an example, in operation, a core may issue a command to shared memory logic 104 specifying a program to download to a target processing unit and data to be processed. The shared memory logic 104, in turn, sends a signal, via interface 158, awakening a given processing unit from a "sleep" mode into I/O mode. The input buffer of the processing unit then receives a command from the shared memory logic 104 identifying, for example, the size of a program being downloaded, initial conditions, the starting address of the program instructions in shared memory, and program variable values. To avoid unnecessary loading of program code, if the program size is specified as zero, the previously loaded program will be executed. This optimizes initialization of a processing unit when requested to perform the same operation in succession.

After loading the program instructions, setting the variables and initial conditions to the specified values, an instruction in the downloaded program changes the mode of the processing unit from I/O mode to run mode. The processing unit can then write operands to multiply to its output buffers and receive delivery of the multiplier 156 results in its input buffer. Eventually, the program instructions write the final result into the output buffer of the processing unit and change the mode of the processing back to I/O mode. The final results are then transferred from the unit's output buffer to the shared memory logic 104 and the unit returns to sleep mode.

Figure 7:
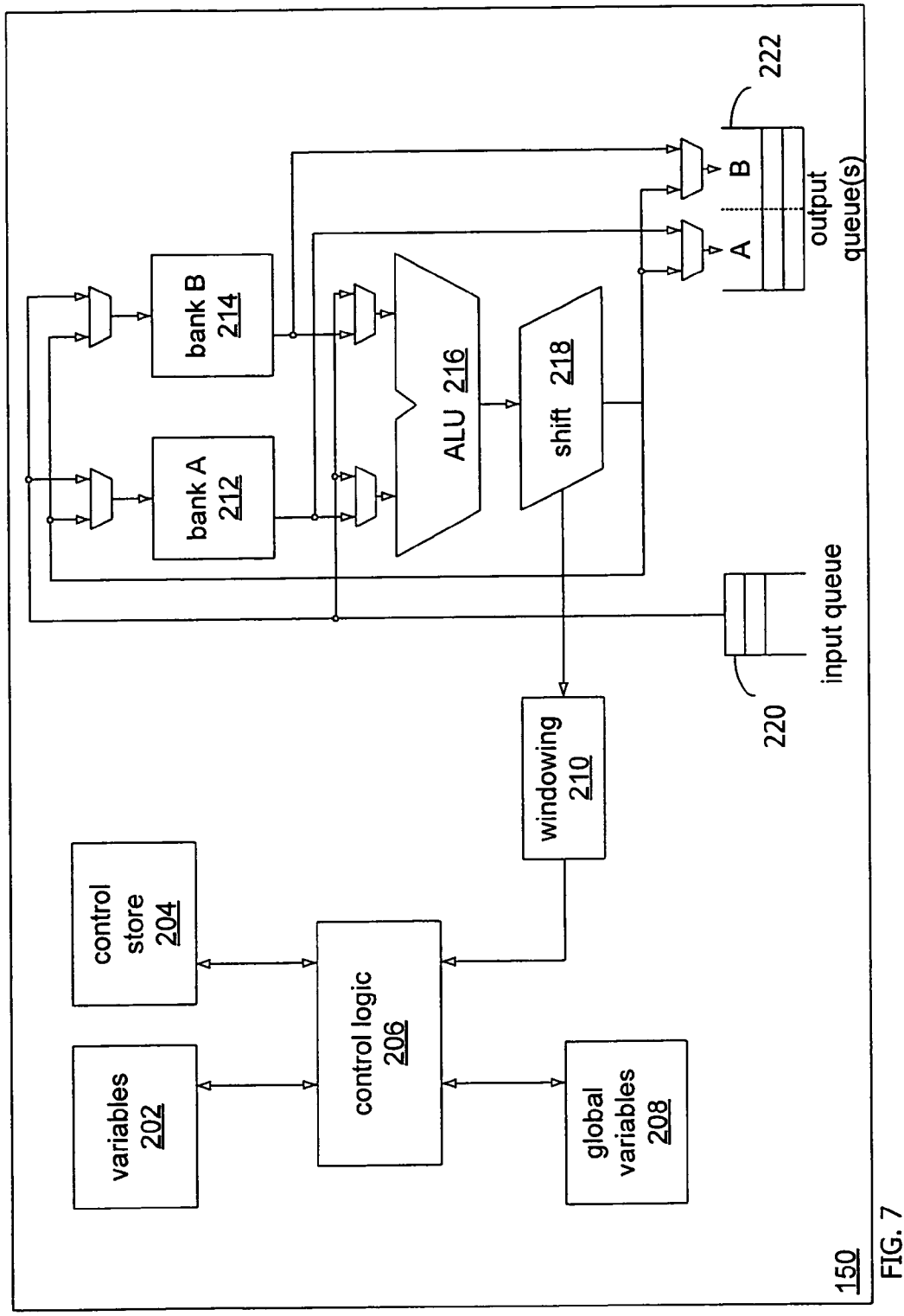
FIG. 7 is a diagram of a programmable processing unit.

FIG. 7 depicts a sample implementation of a programmable processing unit 150. As shown, the processing unit 150 includes an arithmetic logic unit 216 that performs operations such as addition, subtraction, and logical operations such as boolean AND-ing and OR-ing of vectors. The arithmetic logic unit 216 is coupled to, and can operate on, operands stored in different memory resources 220, 212, 214 integrated within the processing unit 150. For example, as shown, the arithmetic logic unit 216 can operate on operands provided by a memory divided into a pair of data banks 212, 214 with each data bank 212, 214 independently coupled to the arithmetic logic unit 216. As described above, the arithmetic logic unit 216 is also coupled to and can operate on operands stored in input queue 220 (e.g., data transferred to the processing unit 150, for example, from the multiplier or shared memory logic 104). The size of operands used by the arithmetic logic unit 216 to perform a given operation can vary and can be specified by program instructions.

As shown, the arithmetic logic unit 216 may be coupled to a shifter 218 that can programmatically shift the arithmetic logic unit 216 output. The resulting output of the arithmetic logic unit 216/shifter 218 can be "re-circulated" back into a data bank 212, 214. Alternately, or in addition, results of the arithmetic logic unit 216/shifter 218 can be written to an output buffer 222 divided into two parallel queues. Again, the output queues 222 can store respective sets of multiplication operands to be sent to the multiplier 156 or can store the final results of program execution to be transferred to shared memory.

The components described above form a cyclic datapath. That is, operands flow from the input buffer 220, data banks 212, 214 through the arithmetic logic unit 216 and either back into the data banks 212, 214 or to the output buffer(s) 222. Operation of the datapath is controlled by program instructions stored in control store 204 and executed by control logic 206. The control logic 206 has a store of global variables 208 and a set of variable references 202 (e.g., pointers) into data stored in data banks 212, 214.

A sample instruction set that can be implemented by control logic 206 is described in the attached Appendix A. Other implementations may vary in instruction operation and syntax.

Generally, the control logic 206 includes instructions ("setup" instructions) to assign variable values, instructions ("exec" and "fexec" instructions) to perform mathematical and logical operations, and control flow instructions such as procedure calls and conditional branching instructions. The conditional branching instructions can operate on a variety of condition codes generated by the arithmetic logic unit 216/shifter 218 such as carry, msb (if the most significant bit=1), lsb (if the least significant bit=1), negative, zero (if the last quadword=0), and zero_vector (if the entire operand=0). Additionally, the processing unit 150 provides a set of user accessible bits that can be used as conditions for conditional instructions.

Figure 8:
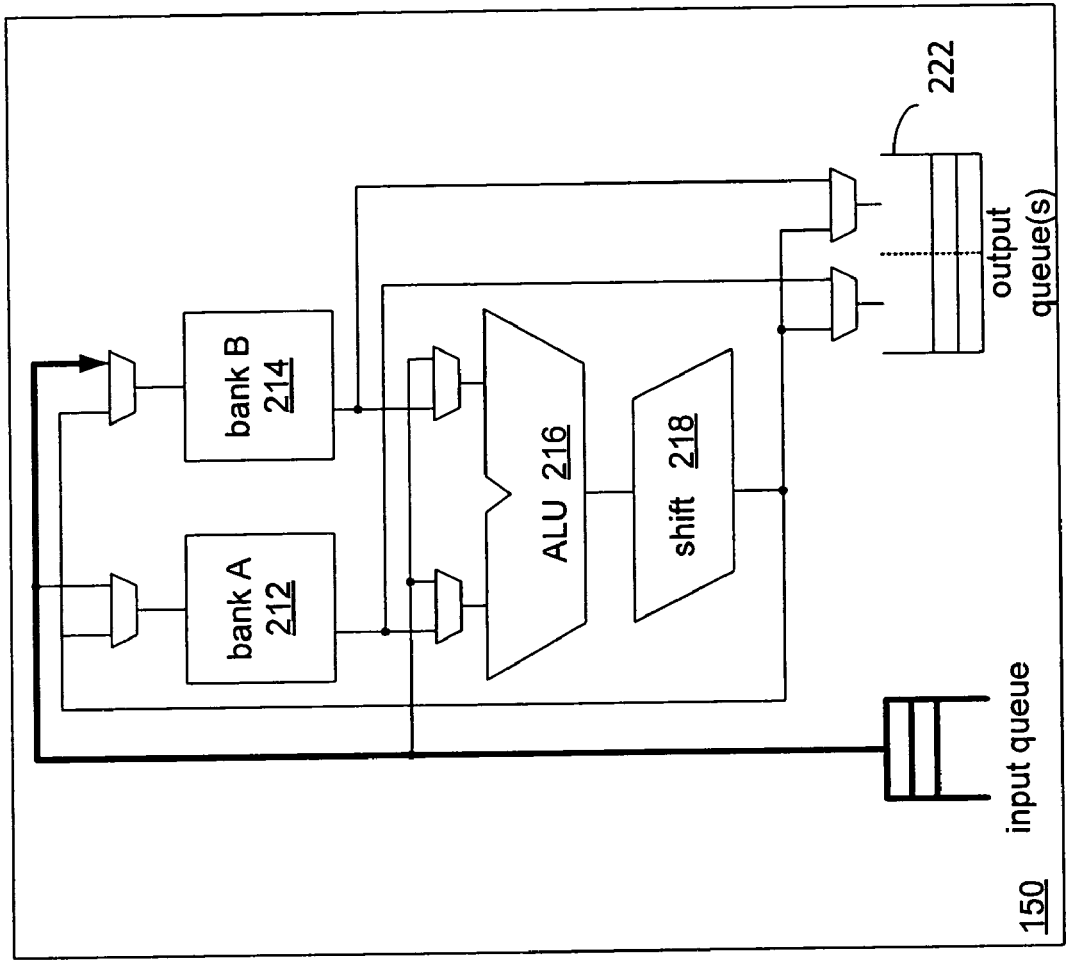
FIG. 8 is a diagram illustrating operation of an instruction to cause transfer of data from an input buffer into a data bank.

The control logic 206 includes instructions that cause data to move along the processing unit 150 datapath. For example, FIG. 8 depicts the sample operation of a "FIFO" instruction that, when the processing unit is in "run" mode, pops data from the input queue 220 for storage in a specified data bank 212, 214. In "I/O" mode, the FIFO instruction can, instead, transfer data and instructions from the input queue 220 to the control store 204.

Figure 9:
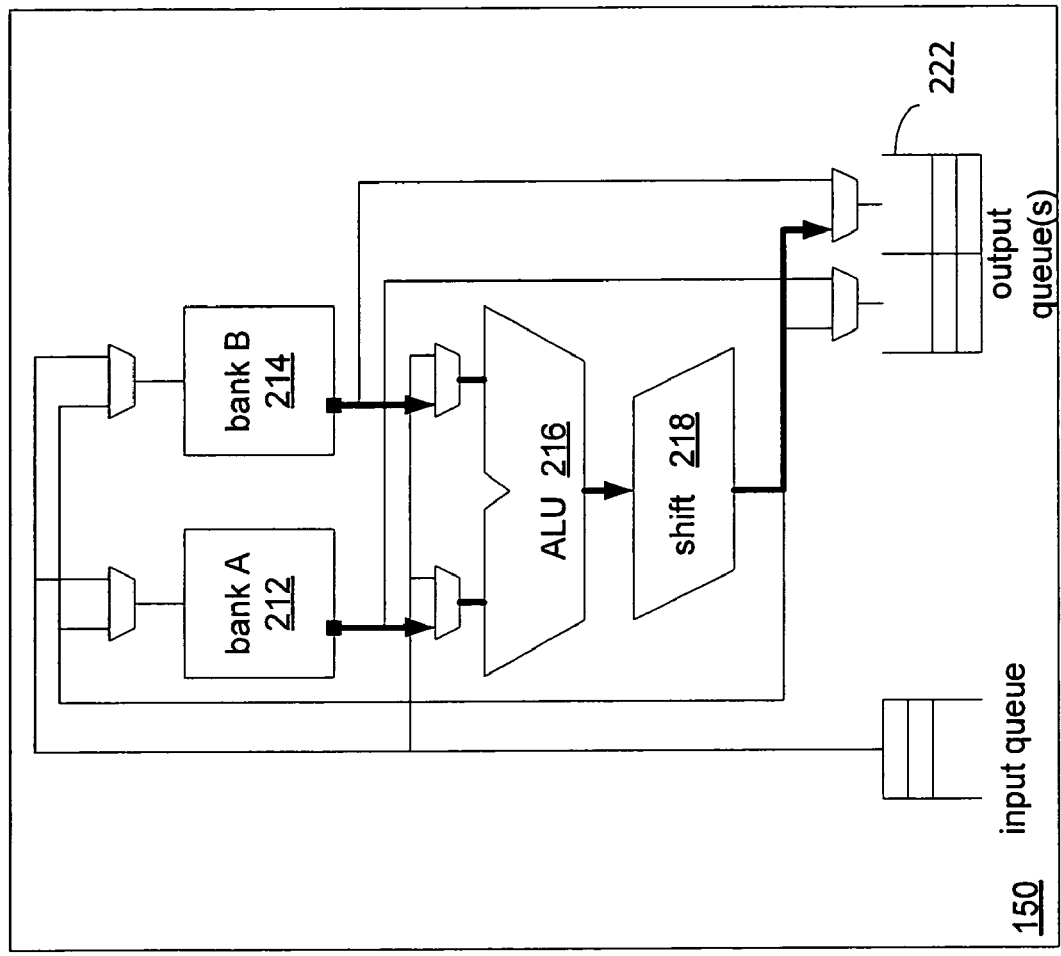
FIGS. 9-11 are diagrams illustrating operation of instructions to cause an arithmetic logic unit operation.
Figure 10:
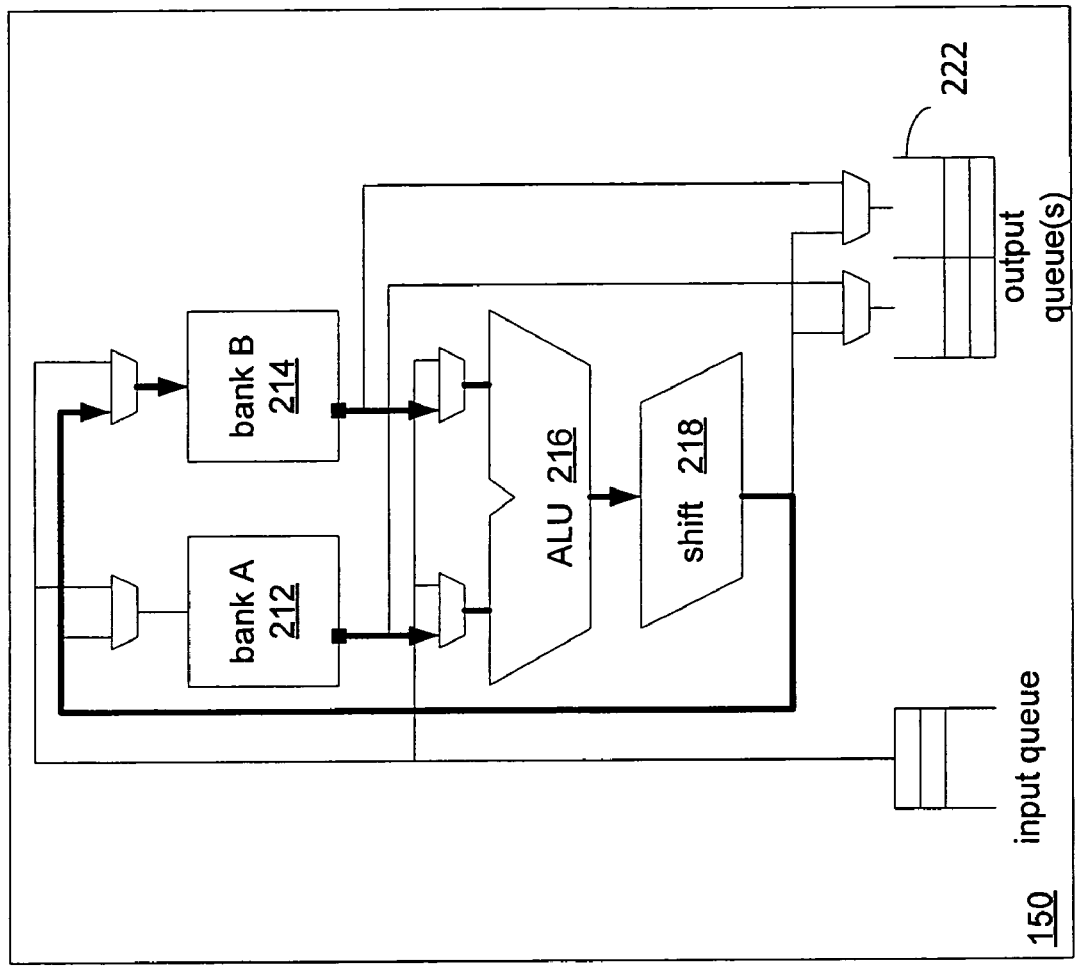

FIG. 9 depicts sample operation of an "EXEC" instruction that supplies operands to the arithmetic logic unit 216. In the example shown, the source operands are supplied by data banks 212, 214 and the output is written to an output queue 222. As shown in FIG. 10, an EXEC instruction can alternately store results back into one of the data banks 212, 214 (in the case shown, bank B 214).

Figure 11:
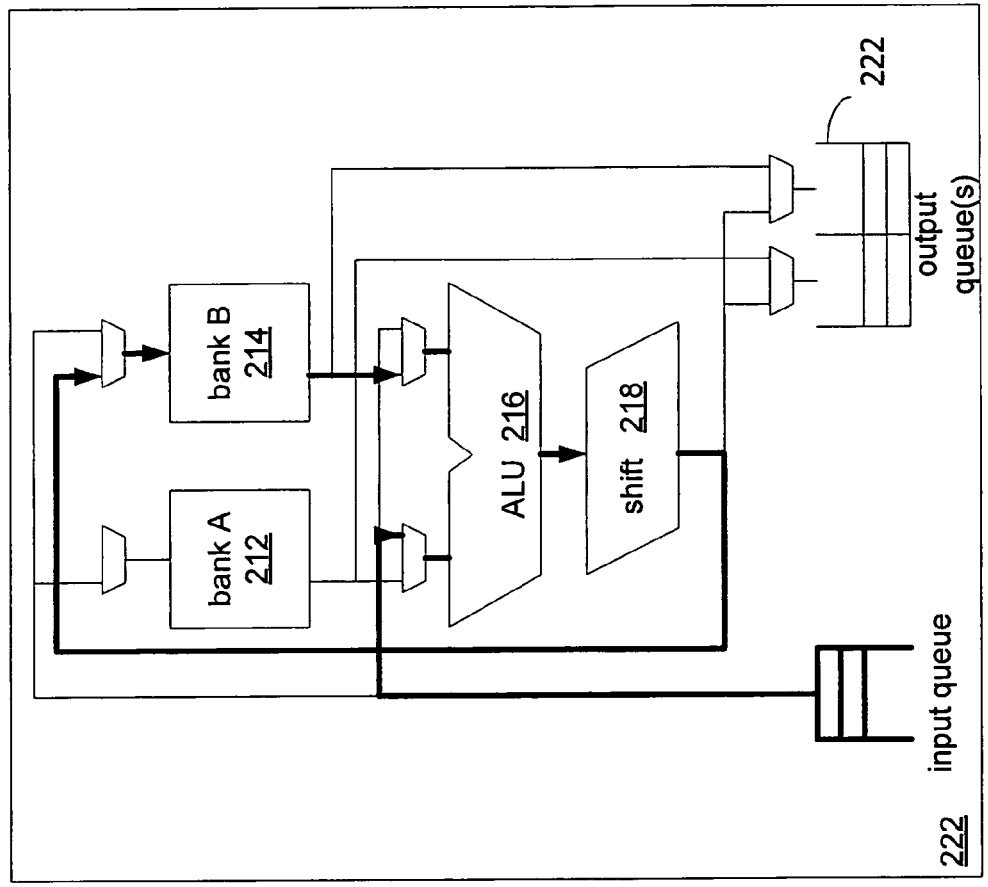

FIG. 11 depicts sample operation of an "FEXEC" (FIFO EXEC) instruction that combines aspects of the FIFO and EXEC instructions. Like an EXEC instruction, an FEXEC instruction supplies operands to the arithmetic logic unit 216. However, instead of operands being supplied exclusively by the data banks 212, 214, an operand can be supplied from the input queue 222.

Figure 12:
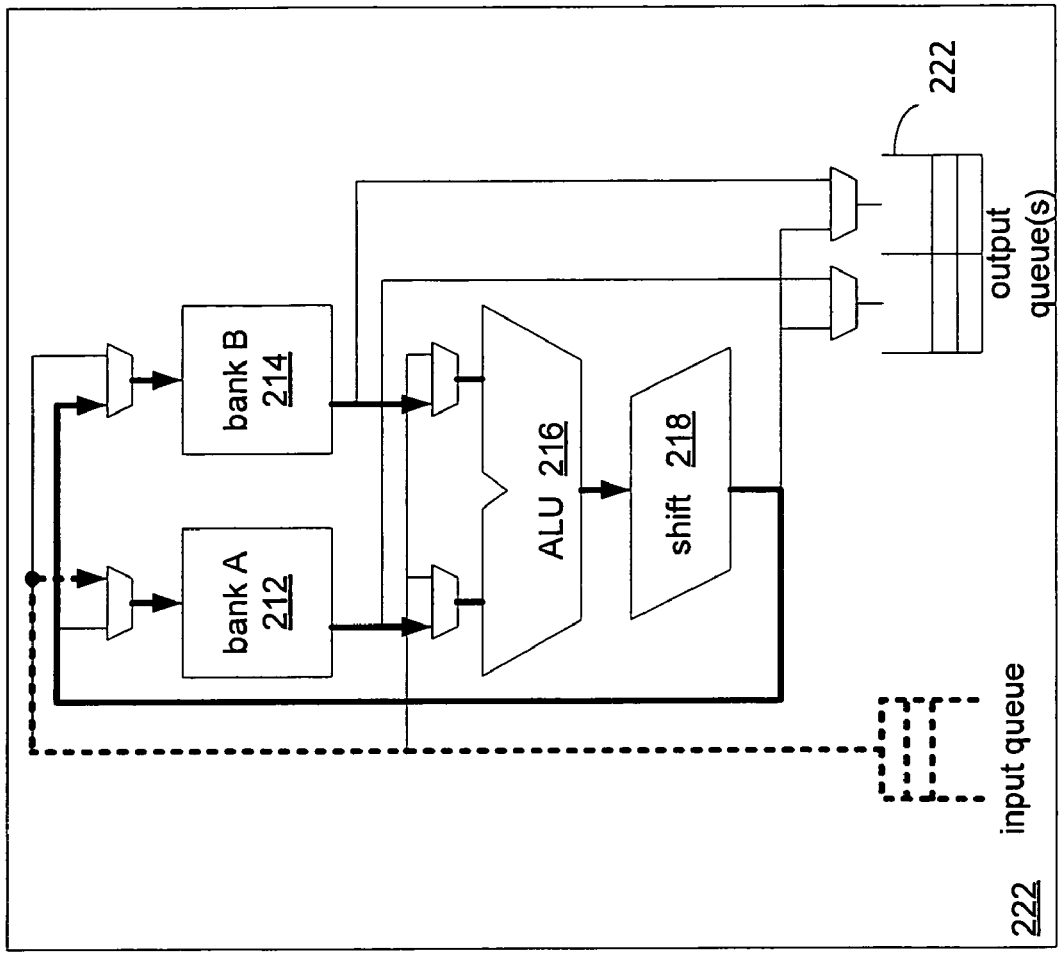
FIG. 12 is a diagram illustrating concurrent operation of datapath instructions.

Potentially, different ones of the datapath instructions can be concurrently operating on the datapath. For example, as shown in FIG. 12, an EXEC instruction may follow a FIFO instruction during the execution of a program. While these instructions may take multiple cycles to complete, assuming the instructions do not access overlapping portions of the data banks 212, 214, the control logic 206 may issue the EXEC instruction before the FIFO instruction completes. To ensure that the concurrent operation does not deviate from the results of in-order operation, the control logic 206 may determine whether concurrent operation would destroy data coherency. For example, if the preceding FIFO instruction writes data to a portion of data bank A that sources an operand in the subsequent EXEC instruction, the control logic 206 awaits writing of the data by the FIFO instruction into the overlapping data bank portion before starting operation of the EXEC instruction on the datapath.

In addition to concurrent operation of multiple datapath instructions, the control logic 206 may execute other instructions concurrently with operations caused by datapath instructions. For example, the control logic 206 may execute control flow logic instructions (e.g., a conditional branch) and variable assignment instructions before previously initiated datapath operations complete. More specifically, in the implementation shown, FIFO instructions may issue concurrently with any branch instruction or any setup instruction except a mode instruction. FIFO instructions may issue concurrently with any execute instruction provided the destination banks for both are mutually exclusive. FEXEC and EXEC instructions may issue concurrently with any mode instructions and instructions that do not rely on the existence of particular condition states. EXEC instructions, however, may not issue concurrently with FEXEC instructions.

Figure 13:
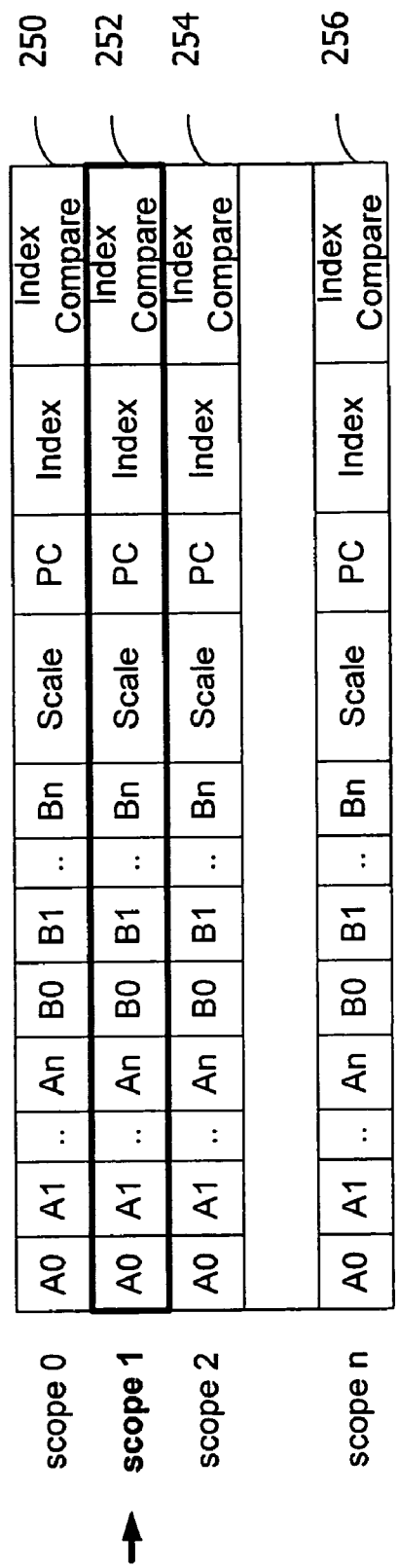
FIG. 13 is a diagram illustrating different sets of variables corresponding to different hierarchical scopes of program execution.

The processing unit 150 provides a number of features that can ease the task of programming cryptographic operations. For example, programs implementing many algorithms can benefit from recursion or other nested execution of subroutines or functions. As shown in FIG. 13, the processing unit may maintain different scopes 250-256 of variables and conditions that correspond to different depths of nested subroutine/function execution. The control logic uses one of the scopes 250-256 as the current scope. For example, the current scope in FIG. 13 is scope 252. While a program executes, the variable and condition values specified by this scope are used by the control logic 206. For example, a reference to variable "A0" by an instruction would be associated with A0 of the current scope 252. The control logic 206 can automatically increment or decrement the scope index in response to procedure calls (e.g., subroutine calls, function calls, or method invocations) and procedure exits (e.g., returns), respectively. For example, upon a procedure call, the current scope may advance to scope 254 before returning to scope 252 after a procedure return.

As shown, each scope 250-256 features a set of pointers into data banks A and B 212, 214. Thus, the A variables and B variables accessed by a program are de-referenced based on the current scope. In addition, each scope 250-256 stores a program counter that can be used to set program execution to the place where a calling procedure left off. Each scope also stores an operand scale value that identifies a base operand size. The instructions access the scale value to determine the size of operands being supplied to the arithmetic logic unit or multiplier. For example, an EXEC instruction may specify operands of N×current-scope-scale size. Each scope further contains Index and Index Compare values. These values are used to generate an Index Compare condition that can be used in conditional branching instructions when the two are equal.

A scope may include a set of user bits that can be used as conditions for conditional instructions.

In addition to providing access to data in the current scope, the processing unit instruction set also provides instructions (e.g., "set scope <target scope>") that provide explicit access to scope variables in a target scope other than the current scope. For example, a program may initially setup, in advance, the diminishing scales associated with an ensuing set of recursive/nested subroutine calls. In general, the instruction set includes an instruction to set each of the scope fields. In addition, the instruction set includes an instruction (e.g., "copy_scope") to copy an entire set of scope values from the current scope to a target scope. Additionally, the instruction set includes instructions to permit scope values to be computed based on the values included in a different scope (e.g., "set variable relative").

Figure 14:
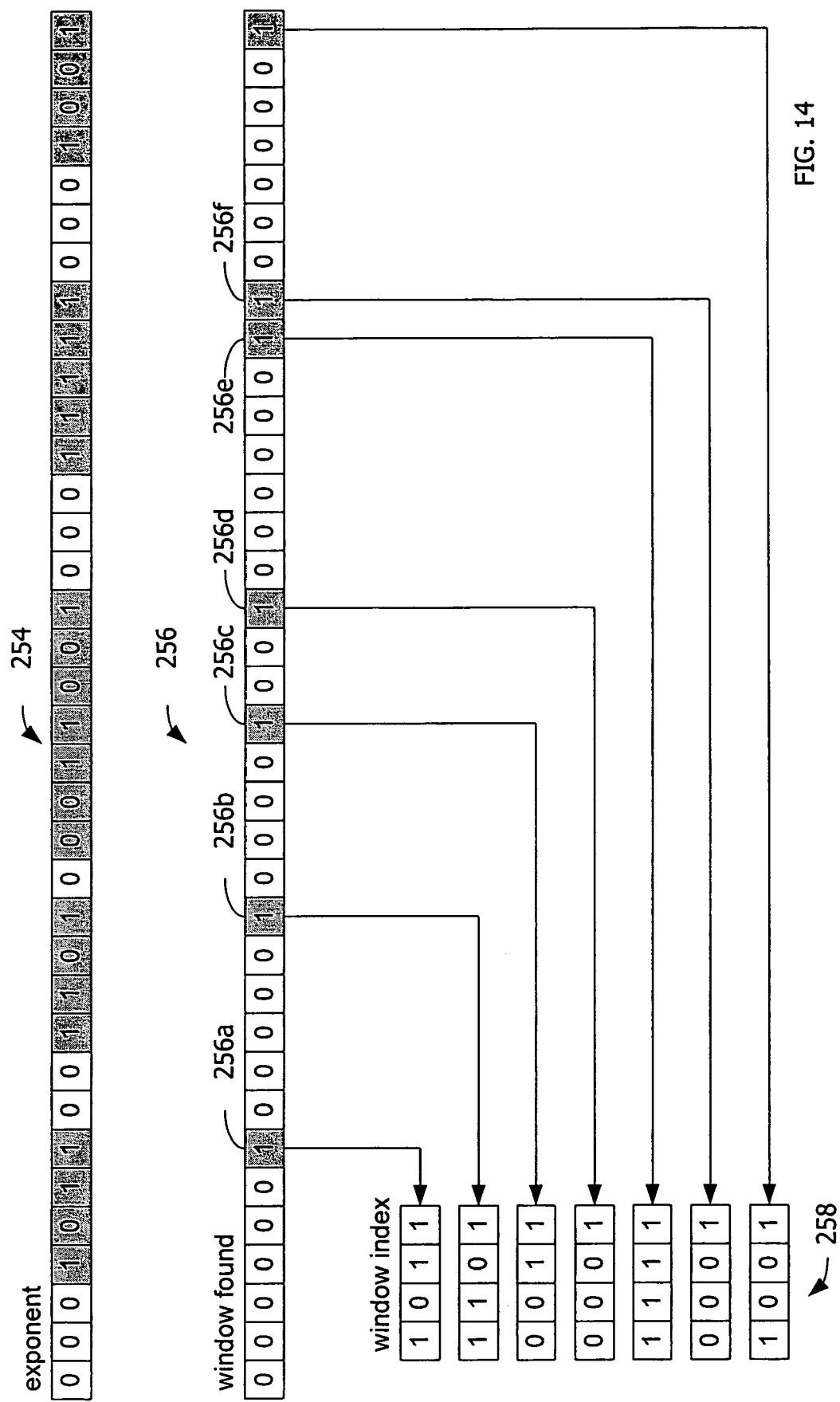
FIG. 14 is a diagram illustrating windowing of an exponent.

In addition to the scope support described above, the processing unit 150 also can include logic to reduce the burden of exponentiation. As described above, many cryptographic operations require exponentiation of large numbers. For example, FIG. 14 depicts an exponent 254 raising some number, g, to the 6,015,455,113-th power. To raise a number to this large exponent 254, many algorithms reduce the operation to a series of simpler mathematical operations. For example, an algorithm can process the exponent 254 as a bit string and proceeding bit-by-bit from left to right (most-significant-bit to least-significant-bit). For example, starting with an initial value of "1", the algorithm can square the value for each "0" encountered in the bit string. For each "1" encountered in the bit string, the algorithm can square the value and multiply by g. For example, to determine the value of $2^9$, the algorithm would operate on the binary exponent of 1001b as follows:

|  | value |
| --- | --- |
| initialization exponent | 1 |
| bit 1 - 1 | $1^2 * 2 = 2$ |
| bit 2 - 0 | $2^2 = 4$ |
| bit 3 - 0 | $4^2 = 16$ |
| bit 4 - 1 | $16^2 * 2 = 512$ |

To reduce the computational demands of this algorithm, an exponent can be searched for windows of bits that correspond to pre-computed values. For example, in the trivially small example of $2^9$, a bit pattern of "10" corresponds to $g^2$ (4). Thus, identifying the "10" window value in exponent "1001" enables the algorithm to simply square the value for each bit within the window and multiply by the precomputed value. Thus, an algorithm using windows could proceed:

|  | value |
| --- | --- |
| initialization exponent | 1 |
| bit 1 - 1 | $1^2 = 1$ |
| bit 2 - 0 | $1^2 = 1$ |
| window "10" value | $1 * 4 = 4$ |
| bit 3 - 0 | $4^2 = 16$ |
| bit 4 - 1 | $16^2 * 2 = 512$ |

Generally, this technique reduces the number multiplications needed to perform an exponentiation (though not in this trivially small example). Additionally, the same window may appear many times within an exponent 254 bit string, thus the same precomputed value can be used.

Potentially, an exponent 254 may be processed in regularly positioned window segments of N-bits. For example, a first window may be the four most significant bits of exponent 254 (e.g., "0001"), a second window may be the next four most significant bits (e.g., "0110") and so forth. Instead of regularly occurring windows, however, FIG. 14 depicts a scheme that uses sliding windows. That is, a window of some arbitrary size of N-bits can be found at any point within the exponent rather than aligned on an N-bit boundary. For example, FIG. 14 shows a bit string 256 identifying the location of 4-bit windows found within exponent 254. For example, an exponent window of "1011" is found at location 256a and an exponent window of "1101" is found at location 256b. Upon finding a window, the window bits are zeroed. For example, as shown, a window of "0011" is found at location 256c. Zeroing the exponent bits enables a window of "0001" to be found at location 256d.

Figure 15:
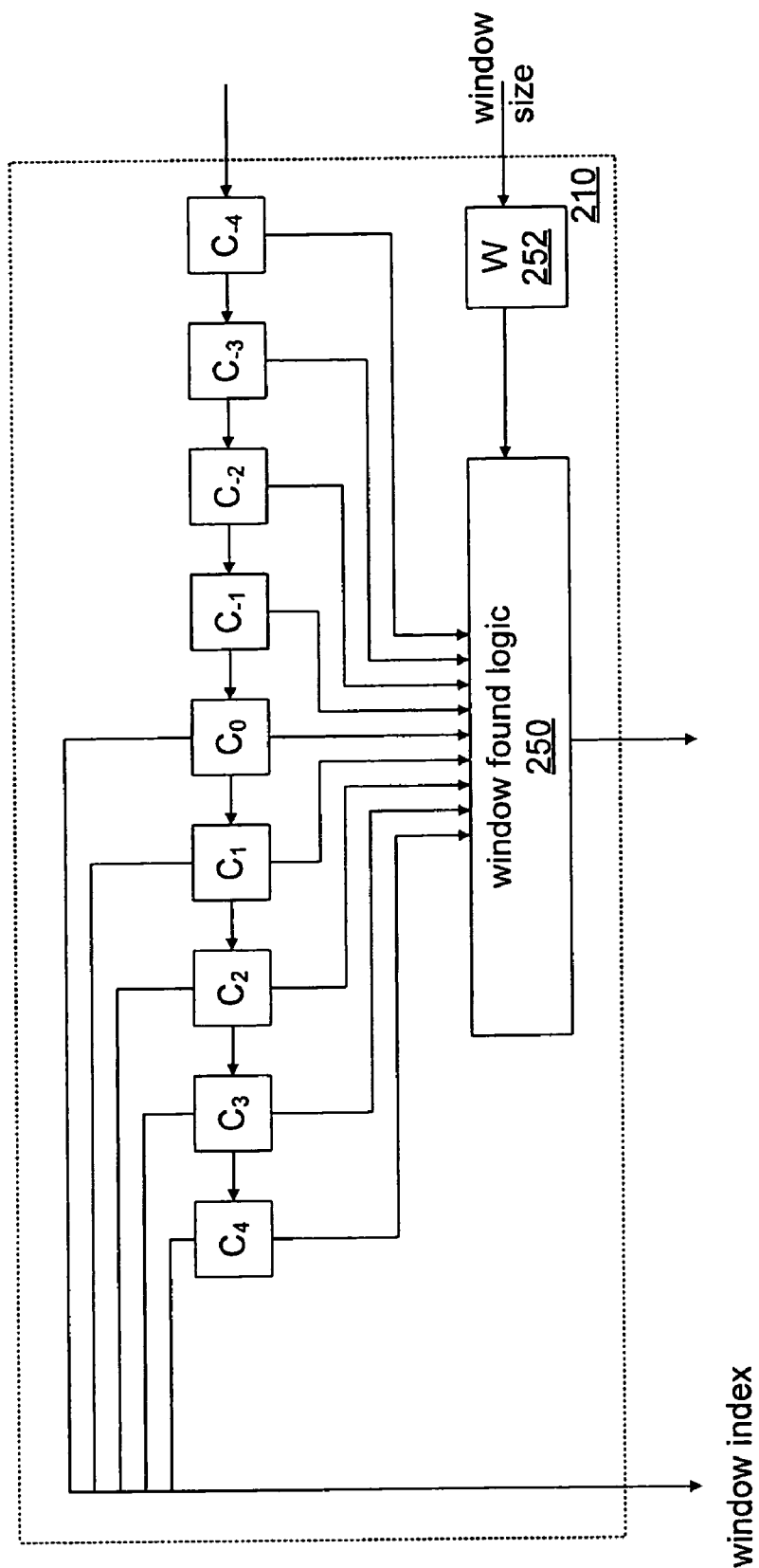
FIG. 15 is a diagram of windowing logic.

FIG. 15 shows logic 210 used to implement a sliding window scheme. As shown, the logic 210 includes a set of M register bits (labeled C 4 to C −4) that perform a left shift operation that enables windowing logic 250 to access M-bits of an exponent string at a time as the exponent bits stream through the logic 210. Based on the register bits and an identification of a window size 252, the windowing logic 250 can identify the location of a window-size pattern of non-zero bits with the exponent. By searching within a set of bits larger than the window-size, the logic 250 can identify windows irrespective of location within the exponent bit string. Additionally, the greater swath of bits included in the search permits the logic 250 to select from different potential windows found within the M-bits (e.g., windows with the most number of "1" bits). For example, in FIG. 14, the exponent 254 begins with bits of "0001", however this potential window is not selected in favor of the window "1011" using "look-ahead" bits (C −1-C −4).

Upon finding a window of non-zero bits, the logic 210 can output a "window found" signal identifying the index of the window within the exponent string. The logic 210 can also output the pattern of non-zero bits found. This pattern can be used as a lookup key into a table of pre-computed window values. Finally, the logic 210 zeroes the bits within the window and continues to search for window-sized bit-patterns.

The logic 210 shown can be included in a processing unit. For example, FIG. 7 depicts the logic 210 as receiving the output of shifter 218 which rotates bits of an exponent through the logic 210. The logic 210 is also coupled to control logic 206. The control logic 206 can feature instructions that control operation of the windowing logic (e.g., to set the window size and/or select fixed or sliding window operation) and to respond to logic 210 output. For example, the control logic 206 can include a conditional branching instruction that operates on "window found" output of the control logic. For example, a program can branch on a window found condition and use the output index to lookup a precomputed value for the window.

Figure 16:
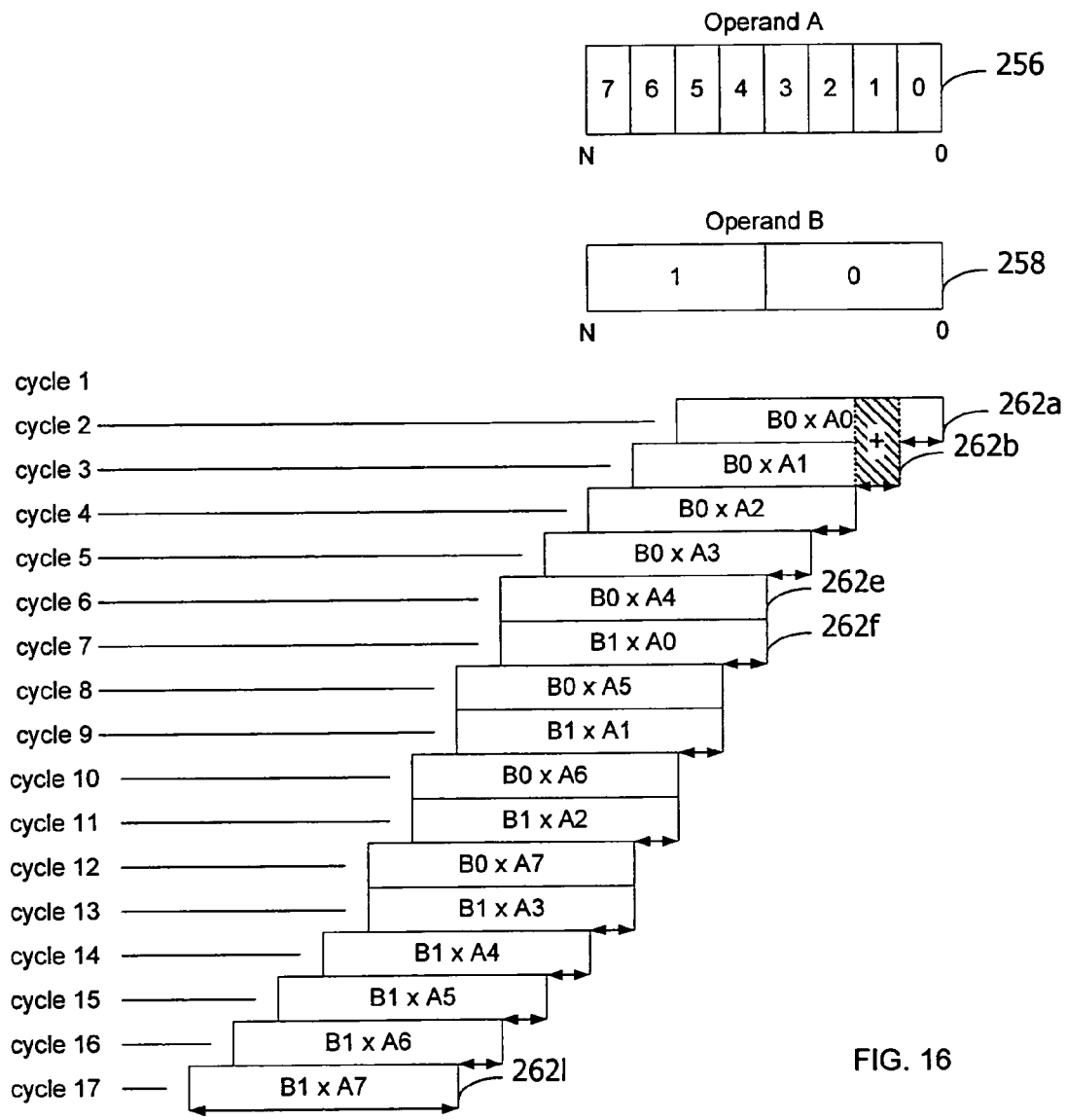
FIG. 16 is a diagram illustrating operation of a hardware multiplier.

As described above, the processing units may have access to a dedicated hardware multiplier 156. Before turning to sample implementation (FIG. 17), FIG. 16 illustrates sample operation of a multiplier implementation. In FIG. 16 the multiplier 156 operates on two operands, A 256 and B 258, over a series of clock cycles. As shown, the operands are handled by the multiplier as sets of segments, though the number of segments and/or the segment size for each operand differs. For instance, in the example shown, the N-bits of operand A are divided into 8-segments (0-7) while operand B is divided into 2-segments (0-1).

As shown, the multiplier operates by successively multiplying a segment of operand A with a segment of operand B until all combinations of partial products of the segments are generated. For example, in cycle 2, the multiplier multiplies segment 0 of operand B (B0) with segment 0 of operand A (A0) 262*a* while in cycle 17 262*l* the multiplier multiplies segment 1 of operand B (B1) with segment 7 of operand A (A7). The partial products are shown in FIG. 16 as boxed sets of bits. As shown, based on the respective position of the segments within the operands, the set of bits are shifted with respect to one another. For example, multiplication of the least significant segments of A and B (B0×A0) 262*a* results in the least significant set of resulting bits with multiplication of the most significant segments of A and B (B1×A7) 262*l* results in the most significant set of resulting bits. The addition of the results of the series of partial products represents the multiplication of operands A 256 and B 258.

Sequencing computation of the series of partial products can incrementally yields bits of the final multiplication result well before the final cycle. For example, FIG. 16 identifies when bits of a given significance can be retired as arrowed lines spanning the bits. For example, after completing B0×A0 in cycle 2, the least significant bits of the final result are known since subsequent partial product results do not affect these bits. Similarly, after completing B0×A1 in cycle 3, bits can be retired since only partial products 262*a* and 262*b* affect the sum of these least significant bits. As shown, each cycle may not result in bits being retired. For example multiplication of different segments can yields bits occupying the exact same significance. For example, the results of B0×A4 in cycle 6 and B1×A0 in cycle 7 exactly overlap. Thus, no bits are retired in cycle 6.

Figure 17:
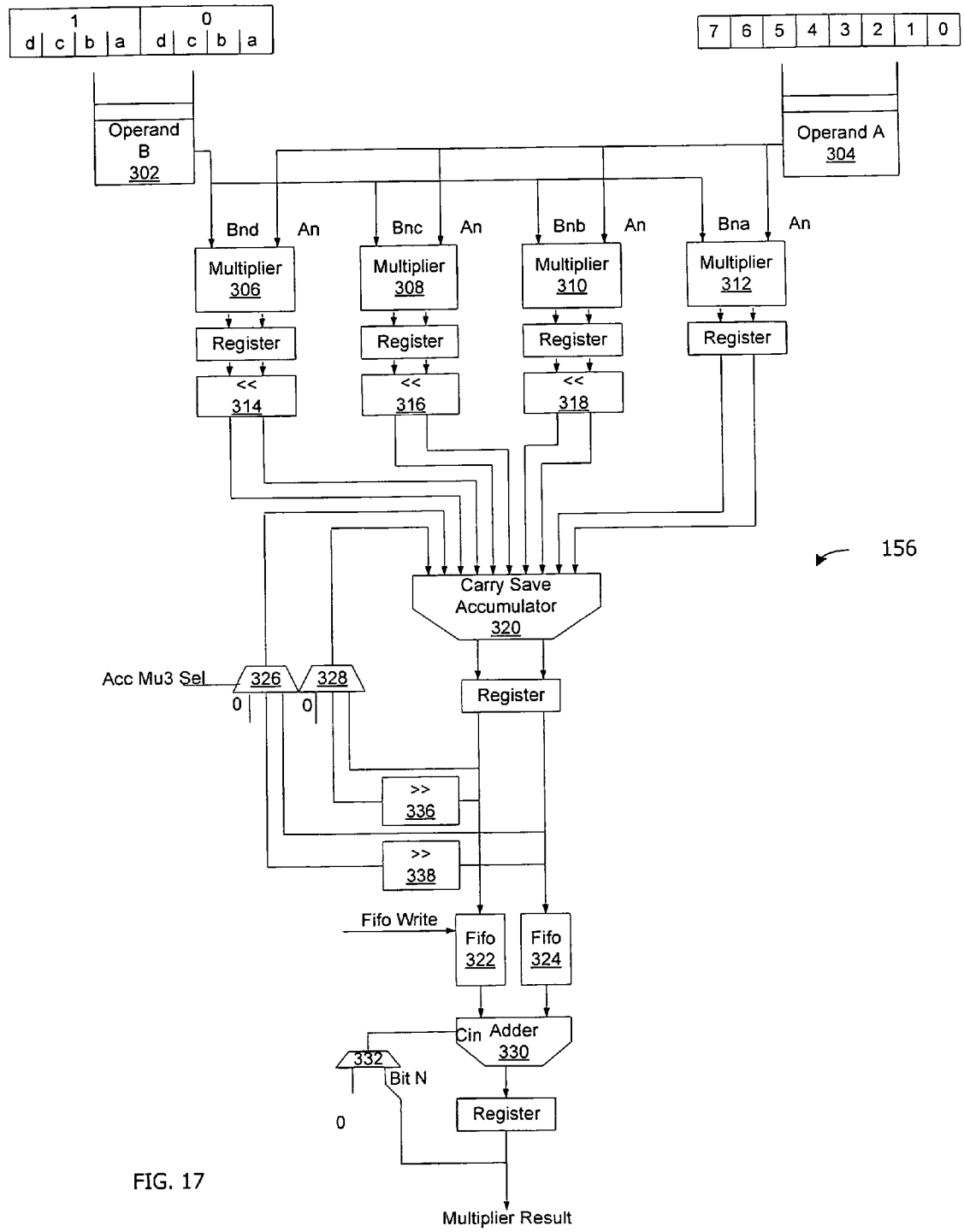
FIG. 17 is a diagram of a hardware multiplier.

FIG. 17 shows a sample implementation of a multiplier 156 in greater detail. The multiplier 156 can process operands as depicted in FIG. 16. As shown, the multiplier 156 features a set of multipliers 306-312 configured in parallel. While the multipliers may be N-bit×N-bit multipliers, the N-bits may not be a factor of 2. For example, for a 512-bit×512-bit multiplier 156, each multiplier may be a 67-bit×67-bit multiplier. Additionally, the multiplier 156 itself is not restricted to operands that are a power of two.

The multipliers 156 are supplied segments of the operands in turn, for example, as shown in FIG. 16. For instance, in a first cycle, segment 0 of operand A is supplied to each multiplier 306-312 while sub-segments d-a of segment 0 of operand B are respectively supplied to each multiplier 306-312. That is, multiplier 312 may receive segment 0 of operand A and segment 0, sub-segment a of operand B while multiplier 310 receives segment 0 of operand A and segment 0, sub-segment, b of operand B in a given cycle.

The outputs of the multipliers 306-312 are shifted 314-318 based on the significance of the respective segments within the operands. For example, shifter 318 shifts the results of Bnb×An 314 with respect to the results of Bna×An 312 to reflect the significance of sub-segment b relative to sub-segment a.

The shifted results are sent to an accumulator 320. In the example shown, the multiplier 156 uses a carry/save architecture where operations produce a vector that represents the results absent any carries to more significant bit positions and a vector that stores the carries. Addition of the two vectors can be postponed until the final results are needed. While FIG. 17 depicts a multiplier 156 that features a carry/save architecture other implementations may use other schemes (e.g., a carry/propagate adder), though a carry/save architecture may be many times more area and power efficient.

As shown, in FIG. 16, sequencing of the segment multiplications can result in the output of bits by the multipliers 306-312 that are not affected by subsequent output by the multipliers 306-312. For example, in FIG. 16, the least significant bits output by the multipliers 306-312 can sent to the accumulator 320 in cycle-2. The accumulator 320 can retire such bits as they are produced. For example, the accumulator 320 can output retired bits to a pair of FIFOs 322, 324 that store the accumulated carry/save vectors respectively. The multiplier 156 includes logic 326, 328, 336, 338 that shifts the remaining carry/save vectors in the multiplier by a number of bits corresponding to the number of bits retired. For example, if the accumulator 320 sends the least significant 64-bits to the FIFOs 322, 324, the remaining accumulator 320 vectors can be right shifted by 64-bits. As shown, the logic can shift the accumulator 320 vectors by a variable amount.

As described above, the FIFOs 322, 324 store bits of the carry/save vectors retired by the accumulator 320. The FIFOs 322, 324, in turn, feed an adder 330 that sums the retired portions of carry/save vectors. The FIFOs 322, 324 can operate to smooth feeding of bits to the adder 330 such that the adder 330 is continuously fed retired portions in each successive cycle until the final multiplier result is output. In other words, as shown in FIG. 16, not all cycles (e.g., cycle-6) result in retiring bits. Without FIFOs 322, 324, the adder 330 would stall when these cycles-without-retirement filter down through the multiplier 156. Instead, by filling the FIFOs 322, 324 with the retired bits and deferring dequeuing of FIFO 322, 324 bits until enough bits are retired, the FIFOs 322, 324 can ensure continuous operation of the adder 330. The FIFOs 322, 324, however, need not be as large as the number of bits in the final multiplier 156 result. Instead the FIFOs 322, 324 may only be large enough to store a sufficient number of retired bits such that "skipped" retirement cycles do stall the adder 330 and large enough to accommodate the burst of retired bits in the final cycles.

The multiplier 156 acts as a pipeline that propagates data through the multiplier stages in a series of cycles. As shown the multiplier features two queues 302, 304 that store operands to be multiplied. To support the partial product multiplication scheme described above, the width of the queues 302, 304 may vary with each queue being the width of 1-operand-segment. The queues 302, 304 prevent starvation of the pipeline. That is, as the multipliers complete multiplication of one pair of operands, the start of the multiplication of another pair of operands can immediately follow. For example, after the results of B1×A7 is output to the FIFOs 322, 324, logic 326, 328 can zero the accumulator 320 vectors to start multiplication of two new dequeued operands. Additionally, due to the pipeline architecture, the multiplication of two operands may begin before the multiplier receives the entire set of segments in the operands. For example, the multiplier may begin A×B as soon as segments A0 and B0 are received. In such operation, the FIFOs 322, 324 can not only smooth output of the adder 330 for a given pair of operands but can also smooth output of the adder 330 across different sets of operands. For example, after an initial delay as the pipeline fills, the multiplier 156 may output portions of the final multiplication results for multiple multiplication problems with each successive cycle. That is, after the cycle outputting the most significant bits of A×B, the least significant bits of C×D are output.

The multiplier 156 can obtain operands, for example, by receiving data from the processing unit output buffers. To determine which processing unit to service, the multiplier may feature an arbiter (not shown). For example, the arbiter may poll each processing unit in turn to determine whether a given processing unit has a multiplication to perform. To ensure multiplier 156 cycles are not wasted, the arbiter may determine whether a given processing unit has enqueued a sufficient amount of the operands and whether the processing unit has sufficient space in its input buffer to hold the results before selecting the processing unit for service.

The multiplier 156 is controlled by a state machine (not shown) that performs selection of the segments to supply to the multipliers, controls shifting, initiates FIFO dequeuing, and so forth.

Potentially, a given processing unit may decompose a given algorithm into a series of multiplications. To enable a processing unit to quickly complete a series of operations without interruption from other processing units competing for use of the multiplier 156, the arbiter may detect a signal provided by the processing unit that signals the arbiter to continue servicing additional sets of operands provided by the processing unit currently being serviced by the multiplier. In the absence of such a signal, the arbiter resumes servicing of the other processing units for example by resuming round-robin polling of the processing units.

Figure 18:
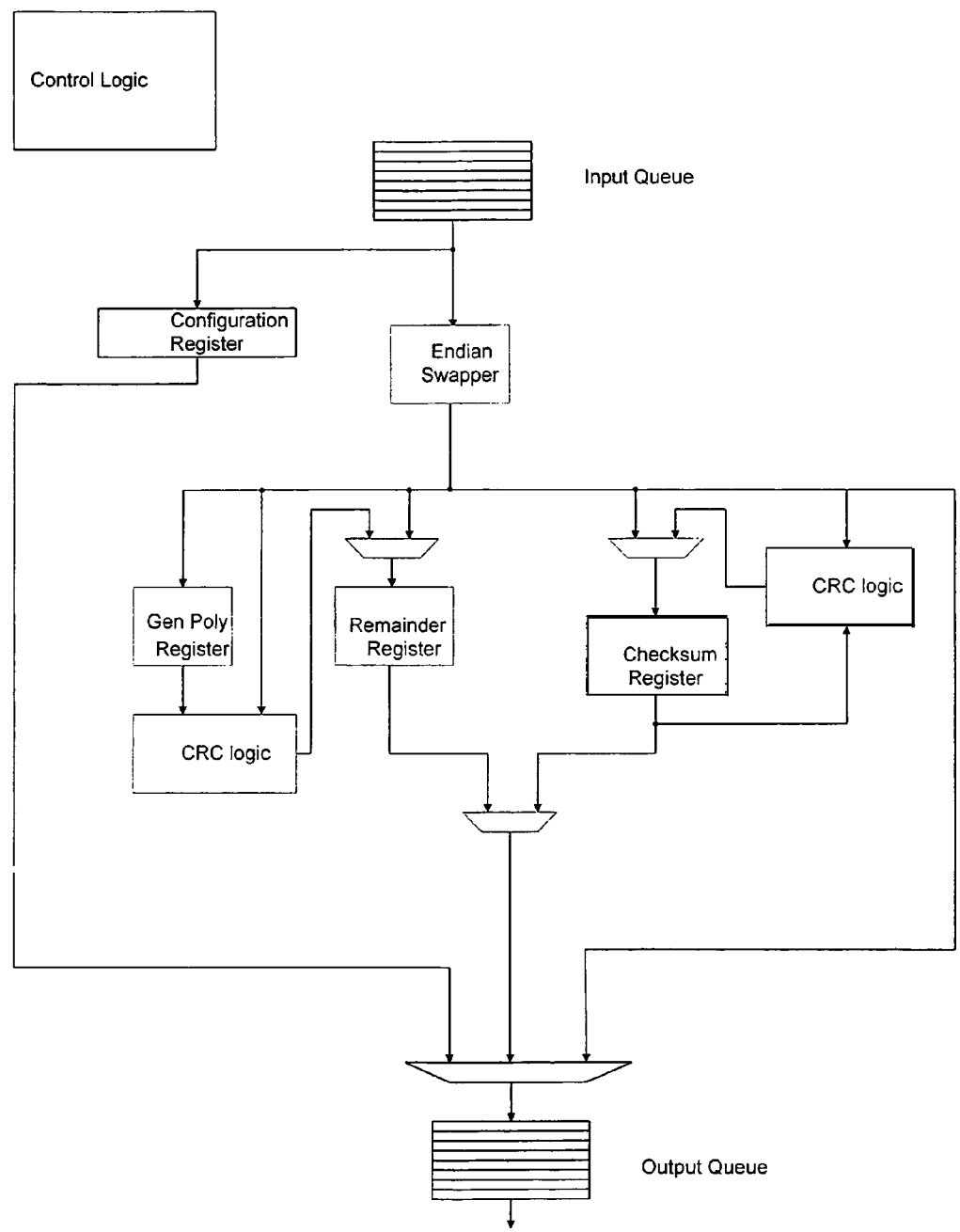
FIGS. 18-20 are diagrams of different types of processing units.

Though the description above described a variety of processing units, a wide variety of processing units may be included in the component 100. For example, FIG. 18 depicts an example of a "bulk" processing unit. As shown, the unit includes an endian swapper to change data between big-endian and little-endian representations. The bulk processing unit also includes logic to perform CRC (Cyclic Redundancy Check) operations on data as specified by a programmable generator polynomial.

Figure 19:
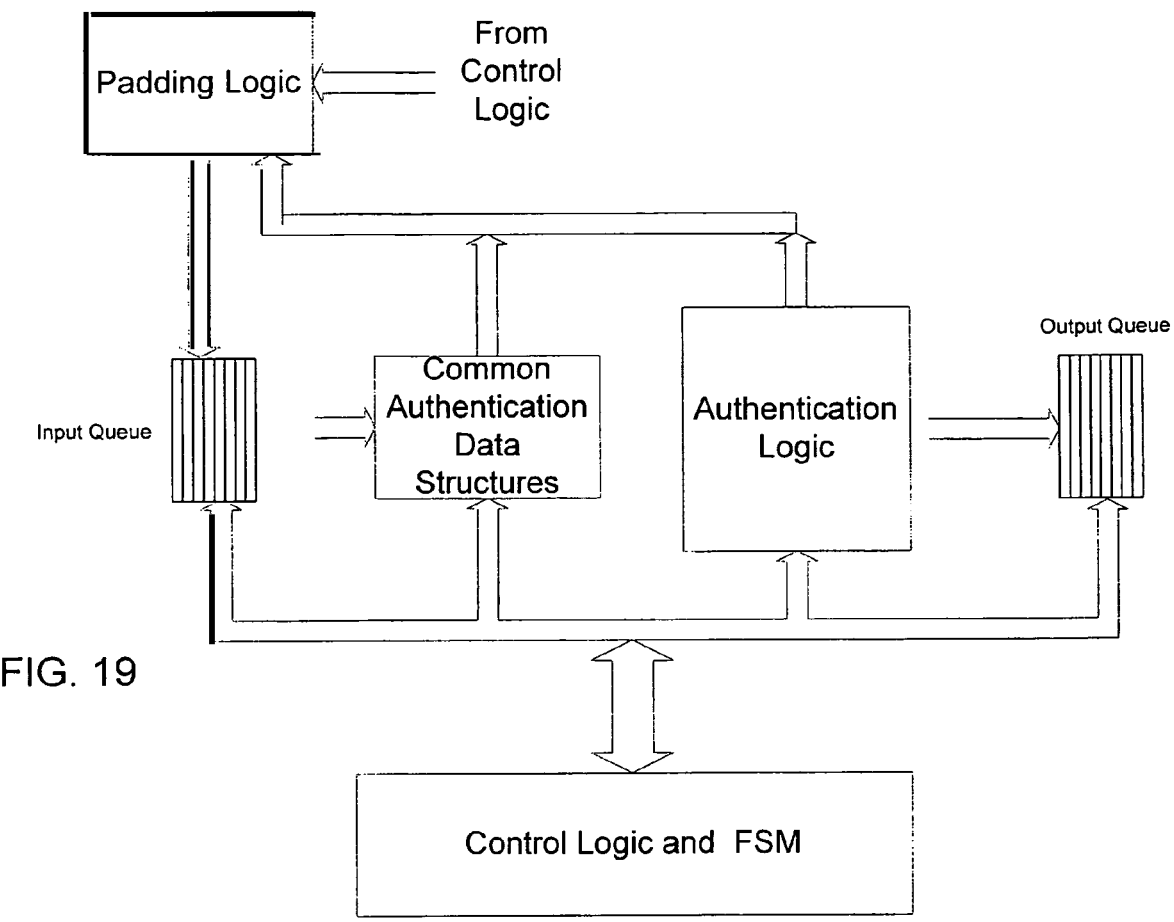

FIG. 19 depicts an example of an authentication/hash processing unit. As shown the unit stores data ("common authentication data structures") that are used for message authentication that are shared among the different authentication algorithms (e.g., configuration and state registers). The unit also includes dedicated hardware logic responsible for the data processing for each algorithm supported (e.g., MD5 logic, SHA logic, AES logic, and Kasumi logic). The overall operation of the unit is controlled by control logic and a finite state machine (FSM). The FSM controls the loading and unloading of data in the authentication data buffer, tracks the amount of data in the data buffer, sends a start signal to the appropriate authentication core, controls the source of data that gets loaded into the data buffer, and sends information to padding logic to help determine padding data.

Figure 20:
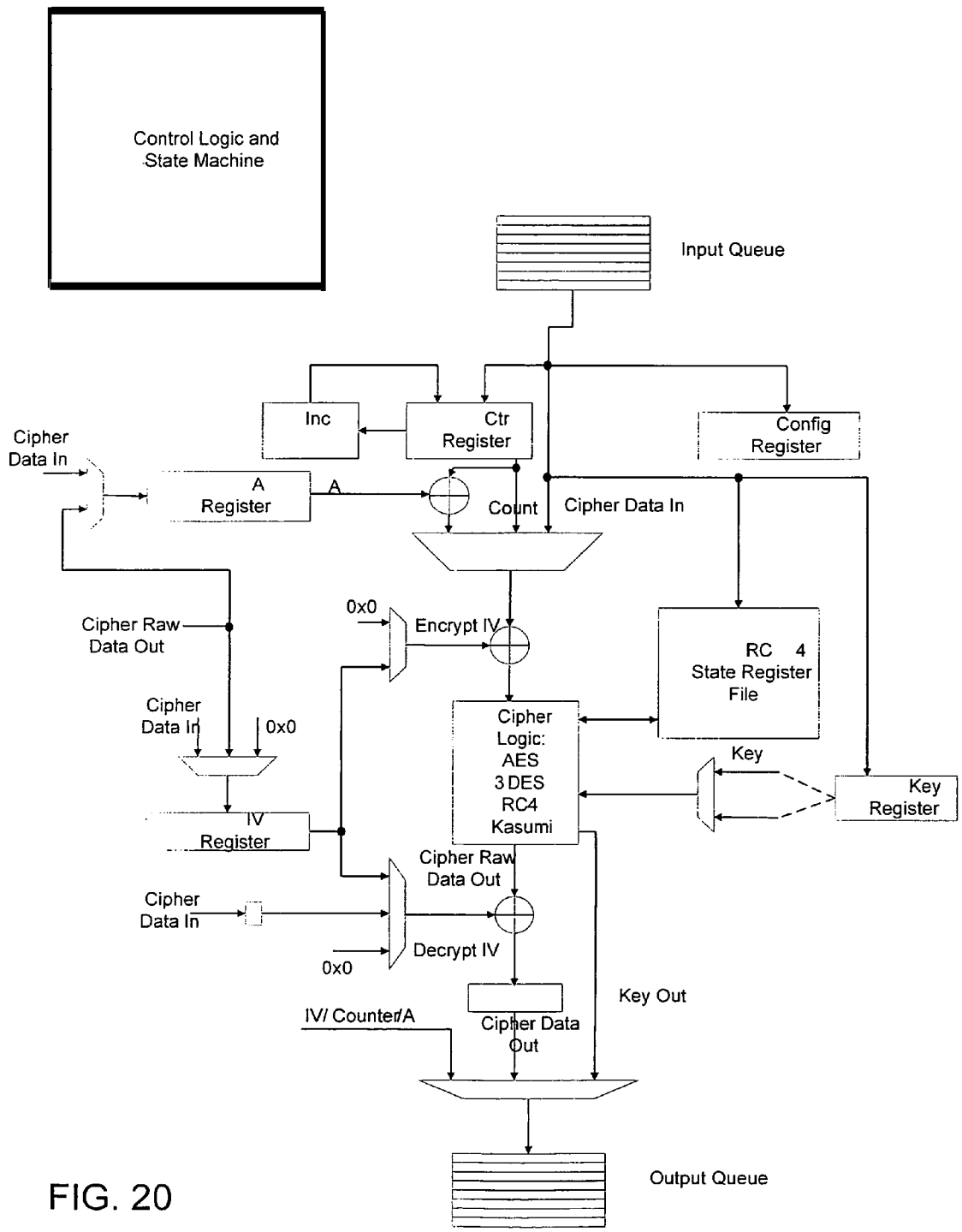

FIG. 20 depicts an example of a cipher processing unit. The unit can perform encryption and decryption, among other tasks, for a variety of different cryptographic algorithms. As shown, the unit includes registers to store state information including a configuration register (labeled "config"), counter register (labeled "ctr"), key register, parameter register, RC4 state register, and IV (Initial Vector) register. The unit also includes multiplexors and XOR gates to support CBC (Cipher Block Chaining), F8, and CTR (Counter) modes. The unit also includes dedicated hardware logic for multiple ciphers that include the logic responsible for the algorithms supported (e.g., AES logic, 3DES logic, Kasumi logic, and RC4 logic). The unit also includes control logic and a state machine. The logic block is responsible for controlling the overall behavior of the cipher unit including enabling the appropriate datapath depending on the mode the cipher unit is in (e.g., in encryption CBC mode, the appropriate IV is chosen to generate the encrypt IV while the decrypt IV is set to 0), selecting the appropriate inputs into the cipher cores throughout the duration of cipher processing (e.g., the IV, the counter, and the key to be used), and generating control signals that determine what data to send to the output datapath based on the command issued by the core 102. This block also initiates and generates the necessary control signals for RC4 key expansion and AES key conversion.

The processing units shown in FIGS. 18-20 are merely examples of different types of processing units and the component may feature many different types of units other than those shown. For example, the component may include a unit to perform pseudo random number generation, a unit to perform Reed-Solomon coding, and so forth.

Figure 21:
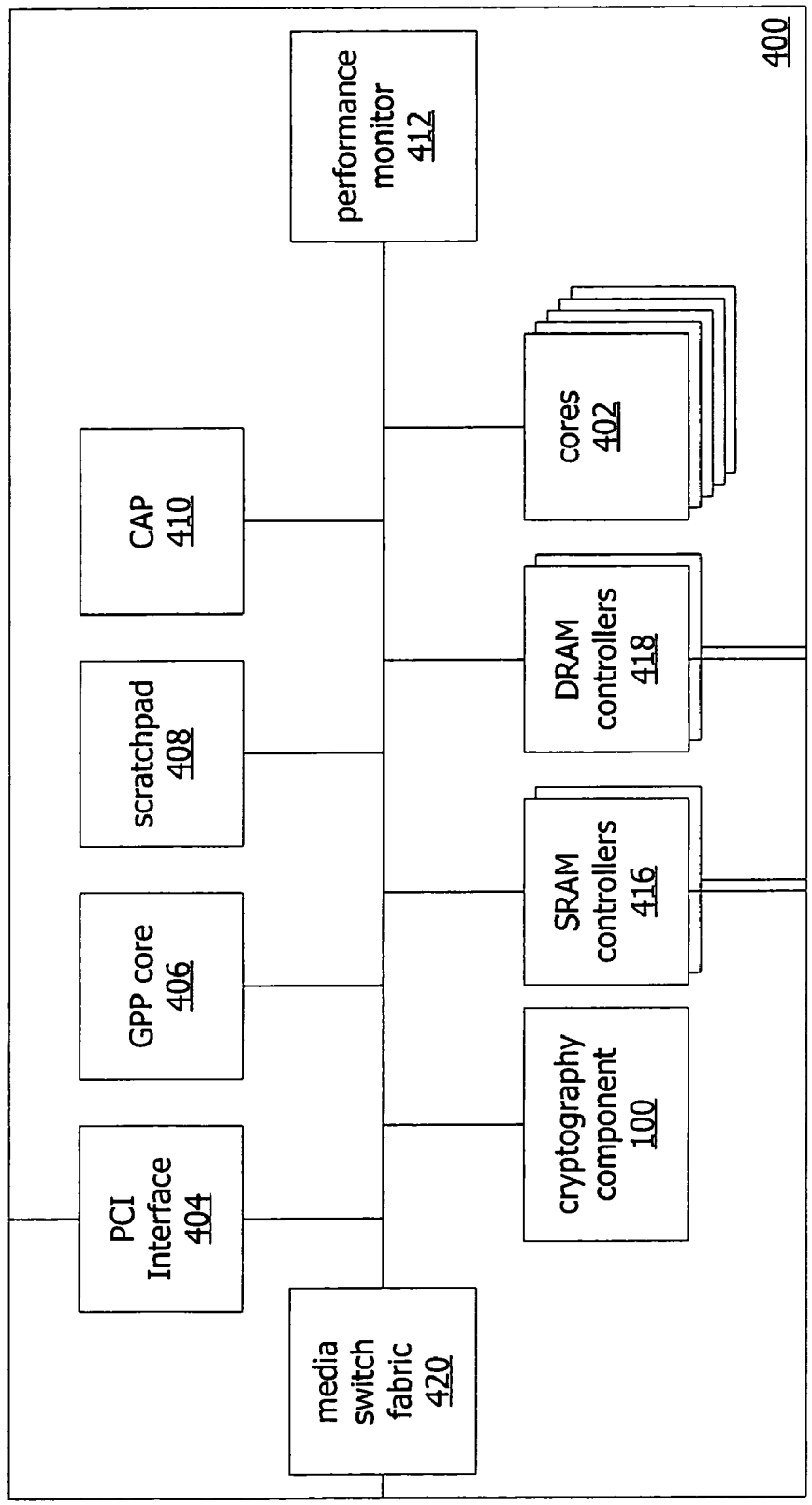
FIG. 21 is a diagram of a processor having multiple processor cores.

The techniques describe above can be implemented in a variety of ways and in different environments. For example, the techniques may be integrated within a network processor. As an example, FIG. 21 depicts an example of network processor 400 that can be programmed to process packets. The network processor 400 shown is an Intel® Internet eXchange network Processor (IXP). Other processors feature different designs.

The network processor 400 shown features a collection of programmable processing cores 402 on a single integrated semiconductor die 400. Each core 402 may be a Reduced Instruction Set Computer (RISC) processor tailored for packet processing. For example, the cores 402 may not provide floating point or integer division instructions commonly provided by the instruction sets of general purpose processors. Individual cores 402 may provide multiple threads of execution. For example, a core 402 may store multiple program counters and other context data for different threads.

As shown, the network processor 400 also features an interface 420 that can carry packets between the processor 400 and other network components. For example, the processor 400 can feature a switch fabric interface 420 (e.g., a Common Switch Interface (CSIX)) that enables the processor 400 to transmit a packet to other processor(s) or circuitry connected to a switch fabric. The processor 400 can also feature an interface 420 (e.g., a System Packet Interface (SPI) interface) that enables the processor 400 to communicate with physical layer (PHY) and/or link layer devices (e.g., MAC or framer devices). The processor 400 may also include an interface 404 (e.g., a Peripheral Component Interconnect (PCI) bus interface) for communicating, for example, with a host or other network processors.

As shown, the processor 400 includes other resources shared by the cores 402 such as the cryptography component 100, internal scratchpad memory, and memory controllers 416, 418 that provide access to external memory. The network processor 400 also includes a general purpose processor 406 (e.g., a StrongARM® XScale® or Intel Architecture core) that is often programmed to perform "control plane" or "slow path" tasks involved in network operations while the cores 402 are often programmed to perform "data plane" or "fast path" tasks.

The cores 402 may communicate with other cores 402 via the shared resources (e.g., by writing data to external memory or the scratchpad 408). The cores 402 may also intercommunicate via neighbor registers directly wired to adjacent core(s) 402. The cores 402 may also communicate via a CAP (CSR (Control Status Register) Access Proxy) 410 unit that routes data between cores 402.

Figure 22:
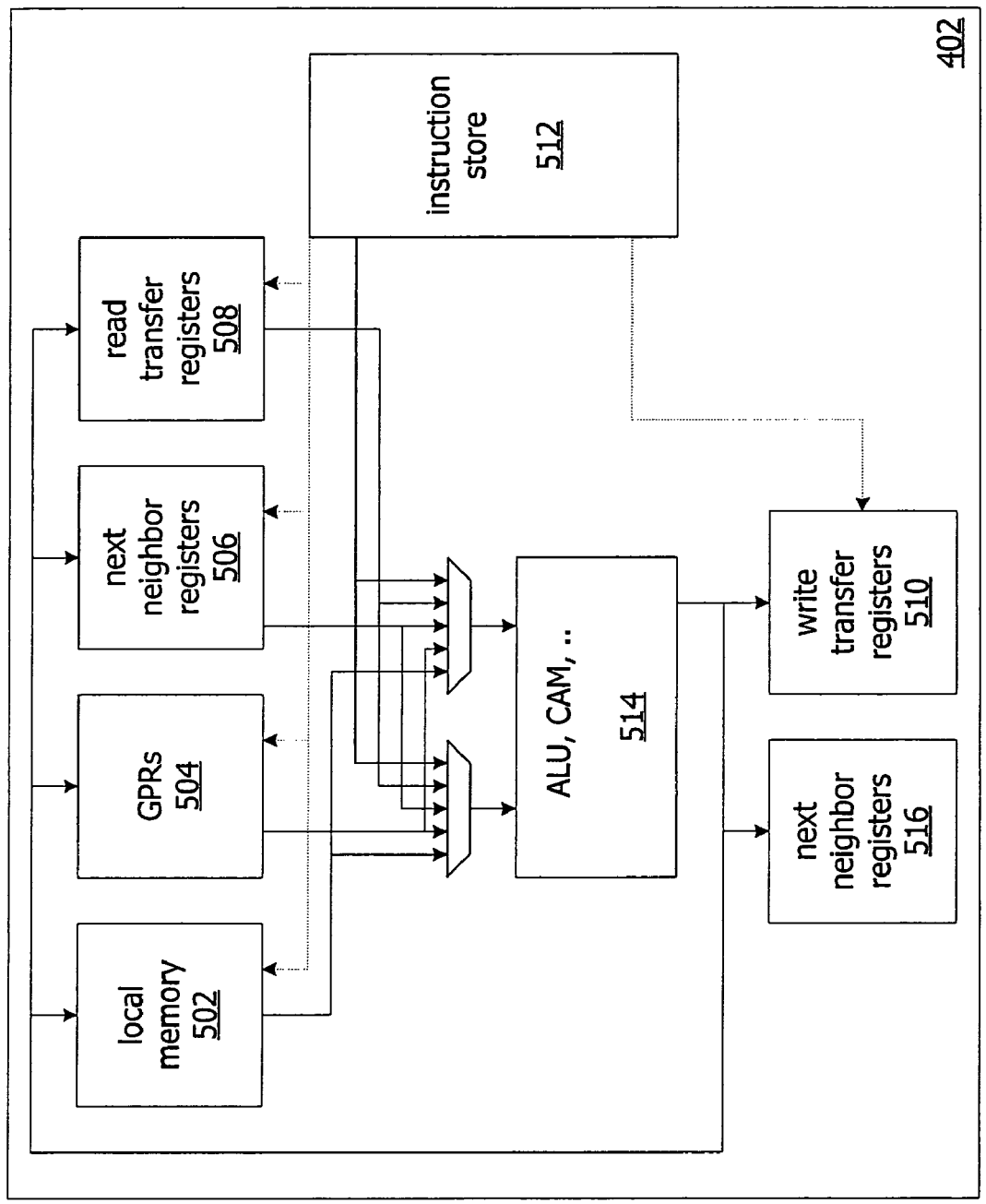
FIG. 22 is a diagram of a processor core.

FIG. 22 depicts a sample core 402 in greater detail. The core 402 architecture shown in FIG. 22 may also be used in implementing the core 102 shown in FIG. 1. As shown the core 402 includes an instruction store 512 to store program instructions. The core 402 may include an ALU (Arithmetic Logic Unit), Content Addressable Memory (CAM), shifter, and/or other hardware to perform other operations. The core 402 includes a variety of memory resources such as local memory 502 and general purpose registers 504. The core 402 shown also includes read and write transfer registers 508, 510 that store information being sent to/received from targets external to the core. The core 402 also includes next neighbor registers 506, 516 that store information being directly sent to/received from other cores 402. The data stored in the different memory resources may be used as operands in the instructions. As shown, the core 402 also includes a commands queue 524 that buffers commands (e.g., memory access commands) being sent to targets external to the core.

To interact with the cryptography component 100, threads executing on the core 402 may send commands via the commands queue 524. These commands may identify transfer registers within the core 402 as the destination for command results (e.g., a completion message and/or the location of encrypted data in memory). In addition, the core 402 may feature an instruction set to reduce idle core cycles while waiting, for example for completion of a request by the cryptography component 100. For example, the core 402 may provide a ctx_arb (context arbitration) instruction that enables a thread to swap out of execution until receiving a signal associated with component 100 completion of an operation.

Figure 23:
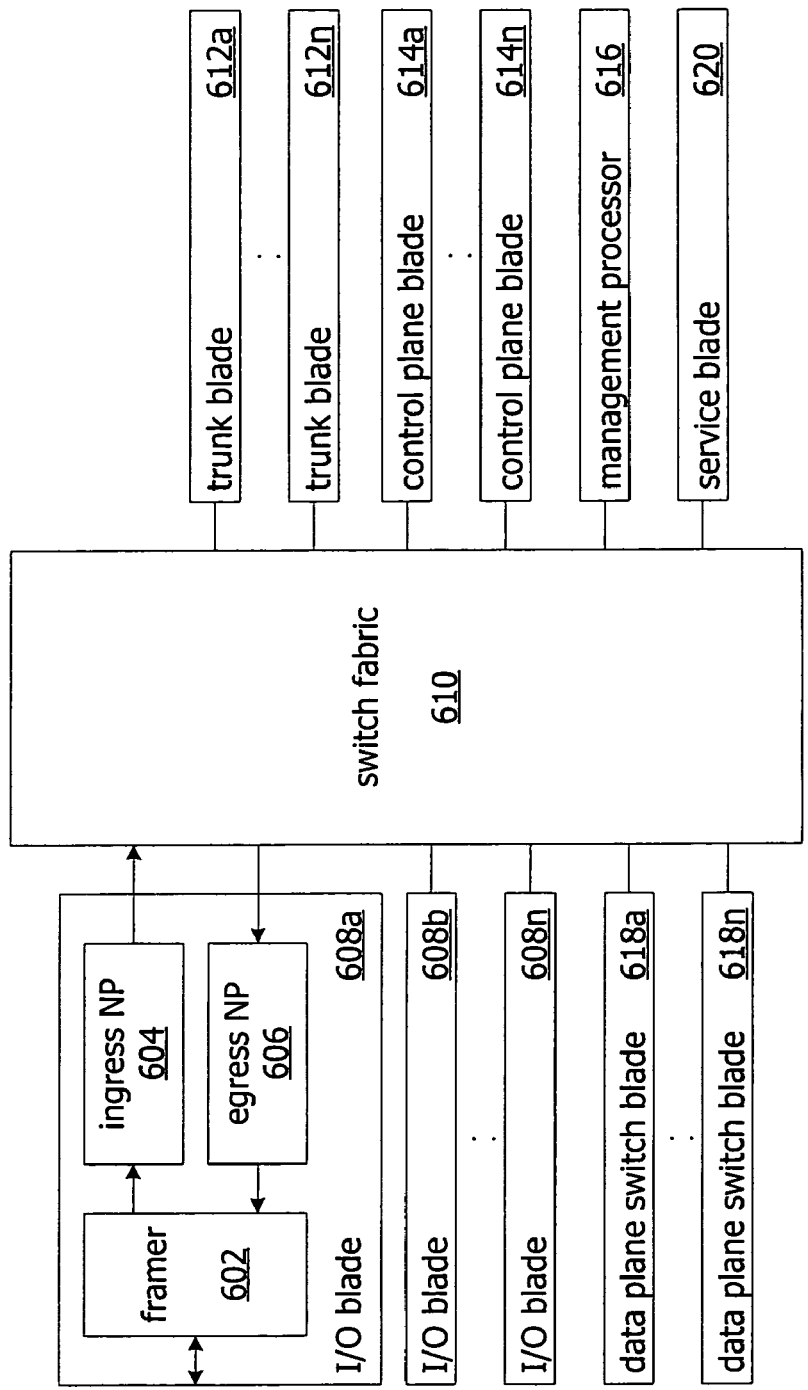
FIG. 23 is a diagram of a network forwarding device.

FIG. 23 depicts a network device that can process packets using a cryptography component. As shown, the device features a collection of blades 608-620 holding integrated circuitry interconnected by a switch fabric 610 (e.g., a crossbar or shared memory switch fabric). As shown the device features a variety of blades performing different operations such as I/O blades 608a-608n, data plane switch blades 618a-618b, trunk blades 612a-612b, control plane blades 614a-614n, and service blades. The switch fabric, for example, may conform to CSIX or other fabric technologies such as HyperTransport, Infiniband, PCI, Packet-Over-SONET, RapidIO, and/or UTOPIA (Universal Test and Operations PHY Interface for ATM).

Individual blades (e.g., 608a) may include one or more physical layer (PHY) devices (not shown) (e.g., optic, wire, and wireless PHYs) that handle communication over network connections. The PHYs translate between the physical signals carried by different network mediums and the bits (e.g., "0"-s and "1"-s) used by digital systems. The line cards 608-620 may also include framer devices (e.g., Ethernet, Synchronous Optic Network (SONET), High-Level Data Link (HDLC) framers or other "layer 2" devices) 602 that can perform operations on frames such as error detection and/or correction. The blades 608a shown may also include one or more network processors 604, 606 that perform packet processing operations for packets received via the PHY(s) 602 and direct the packets, via the switch fabric 610, to a blade providing an egress interface to forward the packet. Potentially, the network processor(s) 606 may perform "layer 2" duties instead of the framer devices 602. The network processors 604, 606 may feature techniques described above.

While FIGS. 21-23 described specific examples of a network processor and a device incorporating network processors, the techniques may be implemented in a variety of architectures including general purpose processors, network processors and network devices having designs other than those shown. Additionally, the techniques may be used in a wide variety of network devices (e.g., a router, switch, bridge, hub, traffic generator, and so forth). Further, many of the techniques described above may be found in components other than components to perform cryptographic operations.

The term circuitry as used herein includes hardwired circuitry, digital circuitry, analog circuitry, programmable circuitry, and so forth. The programmable circuitry may operate on computer programs disposed on a computer readable medium.

Other embodiments are within the scope of the following claims.

APPENDIX A

Sample Instruction Set for Programmable Processing Unit

This appendix contains material which is subject to copyright protection.

| Description | Instruction | | | | | | | | | | | | | | | | |
|---|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| | Execute (exec) | 1 | Shift | | | Op Config | | | | Opcode | | | Ref C | | Zero | | |
| | Fifo In Execute (fexec) | 000 | | | | Op Config | | | | Opcode | | | Shift | | Zero | | |
| | Fifo In Execute and Execute - Second Word | H/R | Operand 0 | | | | | | | Operand 1 | | | Operand 2 | | | | |
| | Fifo In (queue) - Run Mode | 001 | | | F | A | B | | | Operand A | | | Operand B | | | | |
| | Fifo In (queue) - I/O Mode | 001 | | | N/Z | I/S | A/B | | | Operand | | | Ref C | | Scale | | |
| | Branch (branch) | 010 | | | | Condition Code | | | | Target Address | | | | | | | |
| | Setup (setup) | 011 | | | | Setup Type | | | | Type Specific | | | | | | | |

| Description | Execute Instruction Definition - first word | | | | | | | | | | | | | | | | |
|---|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| | Execute (exec) | 1 | Shift | | | Op Config | | | | Opcode | | | Ref C | | Zero | | |

| Bits | Name | Description |
|---|---|---|
| 14:13 | Shift | Shift by 1 configuration (the operation depends on the shift mode set by last setup_shift op)<br>00 - No Shift<br>01 - Left Shift with carry in (carry defined by left shift configuration)<br>10 - Right Shift<br>11 - Right Shift Conditional (if LSB == 0) |
| 12:9 | Op Config | Operand Config<br>Output Queue A - can be enqueued with data from the output of the ALU or from the variable specified in operand 0 (Bank A). ('—' indicates that there is no data enqueued to Output Queue A)<br>Output Queue B - can be enqueued with data from the output of the ALU or from the variable specified in operand 1 (Bank B). ('—' indicates that there is no data enqueued to Output Queue B)<br>When Queues are enqueued with data from the data rams (Op0/1), the data will be the state of the RAM before the ALU operation in a particular cycle<br>Operand 2 of the second control word specifies the index of the destination variable in the current scope to be written and write bank determines which is the relevant bank. ('—' indicates that there is no write to the data ram) |

| Encoding | Output Queue A | Output Queue B | Write Bank | Description |
|---|---|---|---|---|
| 0000 | — | — | — | nop |
| 0001 | — | — | — | no writes - used to set condition codes |
| 0010 | Op 0 | Op 1 | — | |
| 0011 | ALU | — | — | |
| 0100 | — | ALU | — | |
| 0101 | ALU | ALU | — | |
| 0110 | — | — | A | |
| 0111 | — | — | B | |
| 1000 | Op 0 | Op 1 | A | |
| 1001 | Op 0 | Op 1 | B | |
| 1010 | ALU | — | A | |
| 1011 | ALU | — | B | |
| 1100 | — | ALU | A | |
| 1101 | — | ALU | B | |
| 1110 | ALU | ALU | A | |
| 1111 | ALU | ALU | B | |

| Bits | Name | Description |
|---|---|---|
| 8:5 | Opcode | ALU configuration (note: carry refers to the previous carry generated by the ALU)<br>0000 - A<br>0001 - A + carry<br>0010 - B<br>0011 - B + carry<br>0100 - A + B<br>0101 - A + B + carry<br>0110 - A − B<br>0111 - A − B + carry<br>1000 - B − A<br>1001 - B − A + carry<br>1010 - A config_xor B<br>1011 - not A + carry<br>1100 - A and B<br>1101 - not B + carry<br>1110 - A or B<br>1111 - carry |
| 4:3 | Ref C | Reference Count - (note: here Scale equals the value of Scale in the current scope)<br>00 - 1<br>01 - Scale<br>10 - 2 × Scale<br>11 - 4 × Scale |
| 2:0 | Zero | Zero field - specifies in the way the most significant word of a vector operation are handled |

| Zero field | A operand | B operand | Ref Count Modifier | Syntax |
|---|---|---|---|---|
| 000 | zeroed | zeroed | +1 | (-,-) + 1 |
| 001 | zeroed | not zeroed | +1 | (-,b) + 1 |
| 010 | not zeroed | zeroed | +1 | (a,-) + 1 |
| 011 | not zeroed | not zeroed | +1 | (a,b) + 1 |
| 100 | n/a | n/a | +0 | (-,-) + 0 |
| 101 | — | — | — | |
| 110 | — | — | — | |
| 111 | n/a | n/a | +0 | win - the shift carry is shifted into the windowing hardware |

| Description | FIFO_IN Execute Instruction Definition - first word | | | | | | | | | | | | | | | |
|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| | Queue In Execute (fexec) | 000 | | | ■ | Op Config | | | Opcode | | | | Shift | | Zero | | |

| Bits | Name | Description |
|---|---|---|
| 12 | unused | |
| 11:9 | Op Config | Operand Config<br>ALU Op A - The source of data to Op A of the ALU is either the input queue or the variable specified in Op 0 of the second instruction word<br>ALU Op B - Same as for ALU Op A<br>Bank A Source - The source of data to be written into Bank A of the data ram can be either the input queue or the result of the ALU<br>Bank B Source - Same as for Bank A Source<br>Op 0 Bank - Variable used as a source of data to the ALU. It can reference either bank A or B depending on the encoding of Op Config<br>Op 1 Bank - Variable used as a destination for data (ALU output or input queue) that is to be written to Bank A ('—' indicates that there is no data written to bank A)<br>Op 2 Bank - Same as for Op 1 Bank, but relevant to Bank B<br>Note: Op0 is fetched before queue/ALU data is written in a given cycle when source == destination. |

| Encoding | ALU Op A | ALU Op B | Bank A Source | Bank B Source | Op 0 Bank | Op 1 Bank | Op 2 Bank |
|---|---|---|---|---|---|---|---|
| 000 | Input Queue | Op 0 | ALU | Input Queue | B | A | B |
| 001 | FIFO | Op 0 | Input Queue | ALU | B | A | B |
| 010 | Op 0 | Input Queue | ALU | Input Queue | A | A | B |
| 011 | Op 0 | Input Queue | Input Queue | ALU | A | A | B |
| 100 | Input Queue | Op 0 | ALU | — | B | A | — |
| 101 | Input Queue | Op 0 | — | ALU | B | — | B |
| 110 | Op 0 | Queue | ALU | — | A | A | — |
| 111 | Op 0 | Queue | — | ALU | A | — | B |

| Bits | Name | Description |
|---|---|---|
| 8:5 | Opcode | ALU configuration (note: carry refers to the previous carry generated by the ALU)<br>0000 - A<br>0001 - A + carry<br>0010 - B<br>0011 - B + carry<br>0100 - A + B<br>0101 - A + B + carry<br>0110 - A – B<br>0111 - A – B + carry<br>1000 - B – A<br>1001 - B – A + carry<br>1010 - A config_xor B<br>1011 - not A + carry<br>1100 - A and B<br>1101 - not B + carry<br>1110 - A or B<br>1111 - carry |
| 4:3 | Shift | Shift by 1 configuration<br>00 - No Shift<br>01 - Left Shift with carry in (carry defined by the left shift configuration)<br>10 - Right Shift<br>11 - Right Shift Conditional (if LSB == 0) The LSB refers to the LSB of the intermediate result vector of the adder |
| 2:0 | Zero | Zero field - specifies the way the most significant word of a vector operation are handled |

| Zero field | A operand | B operand | Ref Count Modifier | Syntax |
|---|---|---|---|---|
| 000 | zeroed | zeroed | +1 | (-,-) + 1 |
| 001 | zeroed | not zeroed | +1 | (-,b) + 1 |
| 010 | not zeroed | zeroed | +1 | (a,-) + 1 |
| 011 | not zeroed | not zeroed | +1 | (a,b) + 1 |
| 100 | n/a | n/a | +0 | (-,-) + 0 |
| 101 | — | — | — | |
| 110 | — | — | — | |
| 111 | n/a | n/a | +0 | win - the shift carry is shifted into the windowing hardware |

| Description | Execute / FIFO_In Execute Instruction Definition - second word | | | | | | | | | | | | | | | |
|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| Queue In Execute and Execute - Second Word | | H/R | Ind 0 | | | Offset 0 | | | | Ind 1 | | | Offset 1 | | | Ind 2 | | | Offset 2 | | |

| Bits | Name | Description |
|---|---|---|
| 15 | H/R | Hold/Release flag<br>0 - Hold the multiplier<br>1 - Release the multiplier |
| 14:13<br>9:8<br>4:3 | Ind | Index - index of variables in the current scope |
| 12:10<br>7:5<br>2:0 | Offset | Offset - an immediate that is shifted left by the value of the current scope's scale and added to the base address of the variable implied by the Ind field. |

| Description | FIFO In - Run mode - Instruction Definition | | | | | | | | | | | | | | | |
|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| FIFO In (queue) - Run Mode | | 001 | | | | F | A | B | | Operand A | | | | | Operand B | | | | |

| Bits | Name | Description |
|---|---|---|
| 12 | F | Full Result flag<br>0 - Dequeue 16 longwords<br>1 - Dequeue 17 longwords |
| 11 | A | Bank A enable - if set queue payload is written to Operand A |
| 10 | B | Bank B enable - if set queue payload is written to Operand B |
| 9:5 | Operand A | Operand as defined in exec/fexec second word - relevant to Bank A |
| 4:0 | Operand B | Operand as defined in exec/fexec second word - relevant to Bank B |

| Description | Fifo In - I/O Mode - Instruction Definition | | | | | | | | | | | | | | | |
|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| Fifo In (queue) - I/O Mode | | 001 | | | | N/Z | I/S | A/B | | Operand | | | | | Ref C | | Scale | | |

| Bits | Name | Description |
|---|---|---|
| 12 | N/Z | Truncated zero field<br>0 - +0 to vector length<br>1 - +1 to vector length (note: an additional quadword will be dequeued and written to data RAM) |
| 11 | I/S | Immediate/Scale flag<br>0 - Immediate - use the Scale field in the ref count calculation instead of the Scale in the current scope (i.e. the local scale will overshadow the global scale variable for the ref count calculation for this vector)<br>1 - Scale - use the Scale in the current scope |
| 10 | A/B | Bank A/Bank B flag<br>0 - Bank A - Operand is a reference to a variable in Bank A<br>1 - Bank B - Operand is a reference to a variable in Bank B |
| 9:5 | Operand | Operand as defined in exec/fexec second word |
| 4:3 | Ref C | Reference Count - same as is used in the execute instruction |
| 2:0 | Scale | Scale - immediate value used to override the scale value in the current scope |

| Description | Setup Instruction Prototype | | | | | | | | | | | | | | | | |
|---|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| | All | | | | 011 | | | | | Instruction Specific | | | | | | | |

| Description | Setup Instruction Definition (instruction set keyword) | | | | | | | | | | | |
|---|---|---|---|---|---|---|---|---|---|---|---|---|
| | | 12 | 11 | 10 | 9 | 8 | 7 | 6 | 5 | 4 | 3 | 2 | 1 | 0 |
| MMP Mode (mode) | | 0000 | | | | Mode | | | | Xor-mode setting | | | | |
| Load Index (index) | | 0001 | | | | L/H | | | | Immediate | | | | |
| Load Index Compare (index_cmp) | | 0010 | | | | L/H | | | | Immediate | | | | |
| Modify Index / Index Compare (index_mod / index_cmp_mod / index_cmp_global / index_global) | | 0011 | | | | I/D | M/G | Global | | I/C | | | | |
| Set Variable Relative - Variable / Global (var_rel / var_rel_global) | | 0100 | | | | A/B | Dest | | Src | | Offset | | | V/G |
| Set Variable Relative - Window / Index (var_rel_win / var_rel_ind) | | 0101 | | | | A/B | Dest | | Src | | Scale | | | I/W |
| Set Variable Immediate A (var_A_imm) | | 0110 | | | | Dest | | | Base Address | | | | |
| Set Variable Immediate B (var_B_imm) | | 0111 | | | | Dest | | | Base Address | | | | |
| Load Carry (carry) | | 1000 | | | | C | User | | S | A | I/U | | | |
| Set User Bit (user_bit) | | 1001 | | | | UBD | V | UBS | | Src | | | | |
| Set Scale (scale) | | 1010 | | | | Shift | | Global | | Src | | | | |
| Set Scope (scope) | | 1011 | | | | Src | | Immed | | Global | | I/D | |
| Set Window Size (window_size) | | 1100 | | | | Size | | G | | S/G | | | |
| Set Shift Mode (shift) | | 1101 | | | | LSC | | RSC | | | | | | |
| Copy Scope (copy_scope) | | 1110 | | | | Immed | | I/T | | | | | | |
| unused | | 1111 | | | | | | | | | | | | |

| Description | Mode | | | | | | | | | | | | |
|---|---|---|---|---|---|---|---|---|---|---|---|---|---|
| | | 12 | 11 | 10 | 9 | 8 | 7 | 6 | 5 | 4 | 3 | 2 | 1 | 0 |
| Mode (mode) | | | 0000 | | | | Mode | | | | | | |

| Bits | Name | Description |
|---|---|---|
| 8:7 | Mode | MMP Mode<br>00 - I/O mode<br>01 - Run mode<br>10 - Sleep - Puts processing unit into idle state<br>11 - nop - single nop instruction |

| Description | Load Index | | | | | | | | | | | | |
|---|---|---|---|---|---|---|---|---|---|---|---|---|---|
| | | 12 | 11 | 10 | 9 | 8 | 7 | 6 | 5 | 4 | 3 | 2 | 1 | 0 |
| Load Index (index) | | | 0001 | | | L/H | | | | Immediate | | | |

| Bits | Name | Description |
|---|---|---|
| 8 | L/H | Low/High flag<br>0 - load the immediate value into the low (LSB) half and zero the high (MSB) half<br>1 - load the immediate value into the high (MSB) half |
| 7:0 | Immediate | The value to be loaded into the index register |

| Description | Load Index Compare | | | | | | | | | | | | |
|---|---|---|---|---|---|---|---|---|---|---|---|---|---|
| | | 12 | 11 | 10 | 9 | 8 | 7 | 6 | 5 | 4 | 3 | 2 | 1 | 0 |
| Load Index Compare (index_cmp) | | | 0010 | | | L/H | | | | Immediate | | | |

| Bits | Name | Description |
|---|---|---|
| 8 | L/H | Low/High flag<br>0 - load the immediate value into the low (LSB) half and zero the high (MSB) half<br>1 - load the immediate value into the high (MSB) half |
| 7:0 | Immediate | The value to be loaded into the index register |

| Description | Modify Index/Index Compare | | | | | | | | | | | | |
|---|---|---|---|---|---|---|---|---|---|---|---|---|---|
| | | 12 | 11 | 10 | 9 | 8 | 7 | 6 | 5 | 4 | 3 | 2 | 1 | 0 |
| Modify Index / Index Compare (index_mod / index_cmp_mod / index_cmp_global / index_global) | | | 0011 | | | I/D | M/G | Global | I/C | | | |

| Bits | Name | Description |
|---|---|---|
| 8 | I/D | Increment/Decrement<br>0 - Increment the destination register if M/G == 0<br>1 - Decrement the destination register if M/G == 0 |
| 7 | M/G | Modify/Global<br>0 - Modify the destination register<br>1 - Set the destination register equal to the global variable specified by the Global field |
| 6:5 | Global | Global variable - index of a global variable |
| 4 | I/C | Index/Index Compare<br>0 - Index is the destination register<br>1 - Index Compare is the destination register |

| Description | Set Variable Relative - Variable / Global | | | | | | | | | | | | |
|---|---|---|---|---|---|---|---|---|---|---|---|---|---|
| | | 12 | 11 | 10 | 9 | 8 | 7 | 6 | 5 | 4 | 3 | 2 | 1 | 0 |
| Set Variable Relative - Variable/Global (var_rel/var_rel_global) | | 0100 | | | | A/B | Dest | | Src | | Offset | | | V/G |

| Bits | Name | Description |
|---|---|---|
| 8 | A/B | Bank select<br>0 - Bank A<br>1 - Bank B |
| 7:6 | Dest | Destination Variable Number - index of a target scope variable |
| 5:4 | Src | Source Variable Number - either an index of a variable in the current scope or a global variable |
| 3:1 | Offset | Offset as defined by the operand definition in the execute command (note: uses the scale in the current scope) |
| 0 | V/G | Variable/Global flag: defines the source variable to be either a variable from the scope or a global variable.<br>0 - Variable: the Src field represents the index of a scope variable<br>1 - Global: the Src field represents the index of a global variable |

| Description | Set Variable Relative - Window / Index | | | | | | | | | | | | |
|---|---|---|---|---|---|---|---|---|---|---|---|---|---|
| | | 12 | 11 | 10 | 9 | 8 | 7 | 6 | 5 | 4 | 3 | 2 | 1 | 0 |
| Set Variable Relative - Window/Index (var_rel_win / var_rel_ind) | | 0101 | | | | A/B | Dest | | Src | | Scale | | | I/W |

| Bits | Name | Description |
|------|------|-------------|
| 8 | A/B | Bank select<br>0 - Bank A<br>1 - Bank B |
| 7:6 | Dest | Destination Variable Number - index of a target scope variable |
| 5:4 | Src | Source Variable Number - index of a current scope variable |
| 3:1 | Scale | Scale as defined by the operand definition in the execute command. The offset portion of the operand definition is supplied by either the current scope index (I/W == 0) or the windowing hardware (I/W == 1). |
| 0 | I/W | Index/Window flag: defines the offset to be either the index in the current scope or the appropriate bits from the windowing hardware.<br>0 - Index: the offset is specified by the index of the current scope<br>1 - Window: the offset is specified by the upper $\{C_1, \ldots, C_{W-1}\}$ bits of the windowing hardware (sliding mode) or the lower $\{C_{-4}, \ldots C_{W-5}\}$ bits (fixed windowing mode). In either case the upper five bits of the windowing hardware ($\{C_0, C_1, C_2, C_3, C_4\}$) are set to zero. |

| Description | Set Variable Immediate A | | | | | | | | | | | | |
|---|---|---|---|---|---|---|---|---|---|---|---|---|---|
| | 12 | 11 | 10 | 9 | 8 | 7 | 6 | 5 | 4 | 3 | 2 | 1 | 0 |
| Set Variable Immediate A (var_A_imm) | | 0110 | | | | Dest | | | | Base Address | | | |

| Bits | Name | Description |
|------|------|-------------|
| 8:7 | Dest | Destination Variable number - the index of a variable in the target scope |
| 6:0 | Base Address | The absolute address that the destination variable is to take |

| Description | Set Variable Immediate B | | | | | | | | | | | | |
|---|---|---|---|---|---|---|---|---|---|---|---|---|---|
| | 12 | 11 | 10 | 9 | 8 | 7 | 6 | 5 | 4 | 3 | 2 | 1 | 0 |
| Set Variable Immediate B (var_B_imm) | | 0111 | | | | Dest | | | | Base Address | | | |

| Bits | Name | Description |
|------|------|-------------|
| 8:7 | Dest | Destination Variable number - the index of a variable in the target scope |
| 6:0 | Base Address | The absolute address that the destination variable is to take |

| Description | Load Carry | | | | | | | | | | | | |
|---|---|---|---|---|---|---|---|---|---|---|---|---|---|
| | 12 | 11 | 10 | 9 | 8 | 7 | 6 | 5 | 4 | 3 | 2 | 1 | 0 |
| Load Carry (carry) | | 1000 | | | | C | User | | S | A | I/U | | |

| Bits | Name | Description |
|---|---|---|
| 8 | C | Carry immediate |
| 7:6 | User | User bit number - index of a user bit in the current scope |
| 5 | S | Shift flag<br>0 - Shift carry is not modified<br>1 - Shift carry is set to the source carry |
| 4 | A | ALU flag<br>0 - ALU carry is not modified<br>1 - ALU carry is set to the source carry |
| 3 | I/U | Immediate/User flag<br>0 - The source carry is set to the C field<br>1 - The source carry is set to the User bit defined by the User field |

| Description | Set User Bit | | | | | | | | | | |
|---|---|---|---|---|---|---|---|---|---|---|---|
| | 12 | 11 | 10 | 9 | 8 | 7 | 6 | 5 | 4 | 3 | 2 | 1 | 0 |
| Set User Bit (user_bit) | | 1001 | | | | UBD | | V | UBS | | Src | | |

| Bits | Name | Description |
|---|---|---|
| 8:7 | UBD | User Bit Destination - index of a user bit in the target scope |
| 6 | V | Value - immediate used to populate the user bit specified by the UBD field (if Src == 2) |
| 5:4 | UBS | User Bit Source - index of a user bit in the current scope used to populate the user bit specified by the UBD field (if Src == 3) |
| 3:2 | Src | Source - selects the source of the boolean that will populate the destination user bit<br>00 - Shift carry<br>01 - ALU carry<br>10 - immediate supplied by the V field<br>11 - user bit defined by the UBS field |

| Description | Set Scale | | | | | | | | | | |
|---|---|---|---|---|---|---|---|---|---|---|---|
| | 12 | 11 | 10 | 9 | 8 | 7 | 6 | 5 | 4 | 3 | 2 | 1 | 0 |
| Set Scale (scale) | | 1010 | | | | Shift_imm | | | Global | | Src | | |

| Bits | Name | Description |
|---|---|---|
| 8:6 | Shift_imm | Shift field - immediate value |
| 5:4 | Global | Global variable - index of a global variable |
| 3:2 | Src | Source - selects which of four sources will populate the scale in the target scope (Hardware will allow scale values to wrap around in 01, 10 modes)<br>00 - immediate contained in the Shift field<br>01 - the current scope scale plus one<br>10 - the current scope scale minus one<br>11 - the value of the (3 lsbs of) global variable defined by the Global field |

| Description | Set Scope | | | | | | | | | | | | |
|---|---|---|---|---|---|---|---|---|---|---|---|---|---|
| | | 12 | 11 | 10 | 9 | 8 | 7 | 6 | 5 | 4 | 3 | 2 | 1 | 0 |
| Set Scope (scope) | | | 1011 | | | Src | | Immed | | | Global | | I/D | |

| Bits | Name | Description |
|---|---|---|
| 8:7 | Src | Source - selects the source of the target scope<br>00 - the Immed field<br>01 - the (3 lsbs of) global variable defined the Global field<br>10 - an increment or decrement (defined by the I/D field) of the current target scope (hardware will allow wrap-around of scope values)<br>11 - the current scope plus one |
| 6:4 | Immed | Immediate value - index of a scope in the variable ram |
| 3:2 | Global | Global variable - index of a global variable |
| 1 | I/D | Increment/Decrement flag<br>0 - Increment the target scope<br>1 - Decrement the target scope |

| Description | Set Window Size | | | | | | | | | | | | |
|---|---|---|---|---|---|---|---|---|---|---|---|---|---|
| | | 12 | 11 | 10 | 9 | 8 | 7 | 6 | 5 | 4 | 3 | 2 | 1 | 0 |
| Set Window Size (window_size) | | | 1100 | | | Size | | | Global | | S/G | | F/S | |

| Bits | Name | Description |
|---|---|---|
| 8:6 | Size | Set Window Size to value of the Size field plus one (encodings 101 and greater are not used; hardware will produce undefined results on such reserved encodings)<br>000 - window size = 1 if S/G == 0<br>001 - window size = 2 if S/G == 0<br>010 - window size = 3 if S/G == 0<br>011 - window size = 4 if S/G == 0<br>100 - window size = 5 if S/G == 0 |
| 5:4 | Global | Global variable - index of a global variable |
| 3 | S/G | Size/Global flag - selects whether the window size is defined by the Size field or a global variable<br>0 - Size field<br>1 - Global variable<br>(note: global uses the same mapping as the Size field - i.e.: window size = global variable + 1)<br>The 3 lsbs of the global variable will be used; these values should not exceed 101 to prevent undefined hardware behavior. |
| 2 | F/S | Fixed/Sliding exponent windows<br>0 - Sliding Window<br>1 - Fixed Lsb Window |

| Description | Set Shift Mode | | | | | | | | | | | | |
|---|---|---|---|---|---|---|---|---|---|---|---|---|---|
| | | 12 | 11 | 10 | 9 | 8 | 7 | 6 | 5 | 4 | 3 | 2 | 1 | 0 |
| Set Shift Mode (shift) | | | 1101 | | | LSC | | | RSC | | | | | |

| Bits | Name | Description |
|---|---|---|
| 8:7 | LSC | Left Shift Configuration<br>00 - nop (i.e. - leave the current config unchanged)<br>01 - arithmetic shift (note: this is equivalent to a logical shift with '0' shifted in)<br>10 - logical shift with '0' shifted in<br>11 - logical shift with shift carry shifted in |
| 6:5 | RSC | Right Shift Configuration<br>00 - nop (i.e. - leave the current config unchanged)<br>01 - arithmetic shift<br>10 - logical shift with '0' shifted in<br>11 - logical shift with shift carry shifted in<br>(the new msb of the most significant word will be the shift carry value prior to this vector operation) |

| Description | Copy Scope | | | | | | | | | | | | |
|---|---|---|---|---|---|---|---|---|---|---|---|---|---|
| | | 12 | 11 | 10 | 9 | 8 | 7 | 6 | 5 | 4 | 3 | 2 | 1 | 0 |
| Copy Scope (copy_scope) | | | 1110 | | | | Immed | | | I/T | | | |

| Bits | Name | Description |
|---|---|---|
| 8:6 | Immed | Immediate value - index of a scope |
| 5 | I/T | Immediate/Target scope flag - selects which destination scope is to equal the contents of the current scope<br>0 - Immediate<br>1 - Target scope |

| Description | Setup Instruction Definition (instruction set keyword) | | | | | | | | | | | | | |
|---|---|---|---|---|---|---|---|---|---|---|---|---|---|---|
| | | 12 | 11 | 10 | 9 | 8 | 7 | 6 | 5 | 4 | 3 | 2 | 1 | 0 |
| User Bit 0 (user0) | | | 1011 | | | | Target Address | | | | | | | |
| User Bit 1 (user1) | | | 1011 | | | | Target Address | | | | | | | |
| User Bit 2 (user2) | | | 1011 | | | | Target Address | | | | | | | |
| User Bit 3 (user3) | | | 1011 | | | | Target Address | | | | | | | |
| Exponentialtion Window Found (window_found) | | | 1011 | | | | Target Address | | | | | | | |
| Shift Carry Set (shift_carry) | | | 1011 | | | | Target Address | | | | | | | |
| Subroutine (subroutine) | | | 1011 | | | | Target Address | | | | | | | |
| Return (return) | | | 1011 | | | | | | | | | | | |
| Conditional subroutine on previous carry/borrow | | | 1011 | | | | Target Address MSBs | | | | | | | |
| Zero: Last Word (zero) | | | 1011 | | | | Target Address | | | | | | | |
| Zero: Entire Vector (zero_vector) | | | 1011 | | | | Target Address | | | | | | | |
| ALU Carry Set (carry) | | | 1011 | | | | Target Address | | | | | | | |
| Negative (negative) | | | 1011 | | | | Target Address | | | | | | | |
| Index: index != index compare in current scope (index) | | | 1011 | | | | Target Address | | | | | | | |
| LSB of first vector == 1 (lsb) | | | 1011 | | | | Target Address | | | | | | | |
| MSB of last vector == 1 (msb) | | | 1011 | | | | Target Address | | | | | | | |
| Unconditional (always) | | | 1011 | | | | Target Address | | | | | | | |

What is claimed is:

1. A multiplier, comprising:
a set of multiple multipliers configured in parallel, the set of multiple multipliers having access to a first operand and a second operand to multiply, the first operand having multiple segments and the second operand having multiple segments;
logic to repeatedly supply a single segment of the second operand to each multiplier of the set of multiple multipliers and to supply multiple respective segments of the first operand to the respective ones of the set of multiple multipliers until each segment of the second operand has been supplied with each segment of the first operand, the logic configured to sequence the segments of the first and second operands supplied to the multipliers so as to produce at least one affected least significant bit and at least one unaffected least significant bit, the at least one affected least significant bit corresponding to a least significant bit or bits of a result of multiplying the single segment of the second operand and the multiple respective segments of the first operand that is/are affected by subsequent output by the multipliers, the at least one unaffected least significant bit corresponding to a least significant bit or bits of a result of multiplying the single segment of the second operand and the multiple respective segments of the first operand that is/are unaffected by subsequent output by the multipliers, the logic further configured to shift the output of different ones of the set of multiple multipliers based, at least in part, on the position of the respective segments within the first operand;
an accumulator coupled to the logic, wherein the accumulator is configured to retire only the at least one unaffected least significant bit; and
logic coupled to the accumulator configured to shift unretired bits of each result of multiplying the single segment of the second operand and the multiple respective segments of the first operand that is unaffected by subsequent output by the multipliers by a number of bits corresponding to the number of bits retired.

2. The multiplier of claim 1, wherein the first operand and second operand consist of operands of a size that is not an integer power of two.

3. The multiplier of claim 1, further comprising a buffer coupled to the accumulator.

4. The multiplier of claim 3, further comprising logic to transfer a set of unaffected least significant bits of the accumulator to the buffer.

5. The multiplier of claim 4, further comprising logic to shift bits of the accumulator in an amount corresponding to the amount of unaffected least significant bits transferred to the buffer.

6. The multiplier of claim 1, further comprising logic to dequeue bits from a buffer after accumulation of bits at the buffer permits a dequeue operation each successive cycle until the buffer has been completely dequeued of data for the operands.

7. The multiplier of claim 1, wherein the logic comprises logic to supply segments of the operands in an order such that the logic output does not produce output affecting less significant bits than the preceding output of the logic.

8. The multiplier of claim 2,
wherein the multiplier comprises a pipeline comprising the set of multiple multipliers, the accumulator, and a buffer;
wherein the access to a first operand and a second operand comprise access to at least one queue of a first set of a first operand and a second operand and a second set of a first operand and a second operand; and
wherein the multiplier comprises logic to have data corresponding to the first set of the first operand and the second operand and the second set of the first operand proceeding through the pipeline at the same time.

9. The multiplier of claim 8,
wherein segments of the second set of a first operand and a second operand are applied to the set of multiple multipliers while data corresponding to multiplication of the first set of a first operand and a second operand remain in the multiplier pipeline.

10. The multiplier of claim 1,
wherein the multiplier is coupled to multiple processing units; and
wherein the multiplier comprises an arbiter to obtain sets of a first operand and a second operand from the same one of the multiple processing unit in succession based on a signal provided by the processing unit.

11. The multiplier of claim 1,
wherein the multiplier further comprises a memory to store the first operand and the second operand as the data for the first operand and the second operand are received by the memory; and
wherein the logic comprises logic to supply segments of the first operand and the second operand to the set of multiple multipliers before data of the entire first operand and the entire second operand have been received by the memory.

12. The multiplier of claim 1,
wherein the set of multiple multipliers comprises a set of identically functioning N×N bits multipliers where N is a positive integer.

13. The multiplier of claim 1,
wherein the accumulator comprises an accumulator to separately accumulate carry bits output by the set of multiple multipliers.

14. The multiplier of claim 1,
wherein the multiplier obtains the first and second operands from at least one output buffer of a one of multiple processing units coupled to the multiplier; and
wherein the multiplier writes the output of multiplication of the first operand and the second operand to an input buffer of the one of the multiple processing units.

15. The multiplier of claim 14,
wherein the multiplier comprises an arbiter to determine whether the input buffer has sufficient storage to store output of the multiplication; and
wherein the arbiter does not obtain the first operand and the second operand from the output buffer of the one of the multiple processing units if the arbiter determines the input buffer does not have sufficient available storage to store the output of the multiplication.

16. A system comprising:
multiple programmable processing units; and
a multiplier, coupled to the multiple programmable processing units, the multiplier comprising:
a set of multiple multipliers configured in parallel, the set of multiple multipliers having accessing to a first operand and a second operand to multiply, the first operand having multiple segments and the second operand having multiple segments;
logic to supply a single segment of the second operand to each multiplier of the set of multiple multipliers and to supply multiple respective segments of the first operand to the respective ones of the set of multiple multipliers until each segment of the second operand has been supplied with each segment of the first operand, the logic configured to sequence the segments of the first and second operands supplied to the multipliers so as to produce at least one affected least significant bit and at least one unaffected least significant bit, the at least one affected least significant bit corresponding to a least significant bit or bits of a result of multiplying the single segment of the second operand and the multiple respective segments of the first operand that is/are affected by subsequent output by the multipliers, the at least one unaffected least significant bit corresponding to a least significant bit or bits of a result of multiplying the single segment of the second operand and the multiple respective segments of the first operand that is/are unaffected by subsequent output by the, the logic further configured to shift the output of different ones of the set of multiple multipliers based, at least in part, on the position of the respective segments within the first operand;

an accumulator coupled to the logic, wherein the accumulator is configured to retire only the at least one unaffected least significant bit; and logic coupled to the accumulator configured to shift unretired bits of each result of multiplying the single segment of the second operand and the multiple respective segments of the first operand that is unaffected by subsequent output by the multipliers by a number of bits corresponding to the number of bits retired.

17. The system of claim 16, wherein the first operand and second operand consist of operands of a size that is not an integer power of two.

18. The system of claim 16, further comprising a buffer coupled to the accumulator.

19. The system of claim 18, further comprising logic to transfer a set of unaffected least significant bits of the accumulator to the buffer.

20. The system of claim 16, further comprising logic to dequeue bits from a buffer after accumulation of bits at the buffer permits a dequeue operation each successive cycle until the buffer has been completely dequeued of data for the operands.

21. The system of claim 16,
wherein the multiplier further comprises memory to store the first operand and the second operand as the data for the first operand and the second operand are received by the memory; and
wherein the logic comprises logic to supply segments of the first operand and the second operand to the set of multiple multipliers before data the entire first operand and the entire second operand have been received by the memory.

22. The system of claim 16,
wherein the set of multiple multipliers comprises a set of identically functioning N×N bits multipliers where N is a positive integer.

23. The system of claim 16,
wherein the multiplier obtains the first and second operands from at least one output buffer of a one of the multiple processing units coupled to the multiplier; and
wherein the multiplier writes the output of multiplication of the first operand and the second operand to an input buffer of the one of the multiple processing units.

24. A system comprising:
a switch fabric; and
a processor, integrated on a single die, coupled to the switch fabric, the processor comprising:

multiple programmable processing units; and
a multiplier, coupled to the multiple programmable processing units, the multiplier comprising:
a set of multiple multipliers configured in parallel, the set of multiple multipliers comprising a set of identically functioning N×N multipliers where N is a positive integer, the set of multiple multipliers having access to a first operand and a second operand to multiply, the first operand having multiple segments and the second operand having multiple segments;

logic to supply a single segment of the second operand to each multiplier of the set of multiple multipliers and to supply multiple respective segments of the first operand to the respective ones of the set of multiple multipliers until each segment of the second operand has been supplied with each segment of the first operand, the logic configured to sequence the segments of the first and second operands supplied to the multipliers so as to produce at least one affected least significant bit and at least one unaffected least significant bit, the at least one affected least significant bit corresponding to a least significant bit or bits of a result of multiplying the single segment of the second operand and the multiple respective segments of the first operand that is/are affected by subsequent output by the multipliers, the at least one unaffected least significant bit corresponding to a least significant bit or bits of a result of multiplying the single segment of the second operand and the multiple respective segments of the first operand that is/are unaffected by subsequent output by the multipliers, the logic further configured to shift the output of different ones of the set of multiple multipliers based, at least in part, on the position of the respective segments within the first operand;

an accumulator coupled to the logic, wherein the accumulator is configured to retire only the least one unaffected least significant bit; and logic coupled to the accumulator configured to shift unretired bits of each result of multiplying the single segment of the second operand and the multiple respective segments of the first operand that is unaffected by subsequent output by the multipliers by a number of bits corresponding to the number of bits retired.

25. The system of claim 24, further comprising logic to transfer a set of unaffected least significant bits of the accumulator to a buffer.

26. The system of claim 24, further comprising logic to dequeue bits from a buffer after accumulation of bits at the buffer permits a dequeue operation each successive cycle until the buffer has been completely dequeued of data for the operands.

27. A method to multiply a first operand and a second operand, comprising:
repeatedly:
supplying a single segment of the second operand to each multiplier of a set of multiple multipliers configured in parallel and supplying multiple respective segments of the first operand to the respective ones of the set of multiple multipliers, wherein the segments of the first and second operands supplied to the multipliers are sequenced so as to produce at least one affected least significant bit and at least one unaffected least significant bit, the at least one affected least significant bit corresponding to a least significant bit or bits of a result of multiplying the single segment of the second operand and the multiple respective segments of the first operand that is/are affected by subsequent output by the multipliers, the at least one unaffected least significant bit corresponding to a least significant bit or bits of a result of multiplying the single segment of the second operand and the multiple respective segments of the first operand that is/are unaffected by subsequent output by the multipliers, shifting the output of different ones of the set of multiple multipliers based, at least in part, on the position of the respective segments within the first operand, retiring only the least one unaffected least significant bit, and shifting unretired bits of each result of multiplying the single segment of the second operand and the multiple respective segments of the first operand that is unaffected by subsequent output by the multipliers by a number of bits corresponding to the number of bits retired, until each segment of the second operand has been supplied with each segment of the first operand.

28. The method of claim 27, further comprising transferring the shifted output to an accumulator.

29. The method of claim 28, transferring a set of unaffected least significant bits of the accumulator to a buffer.

30. The method of claim 29, shifting bits of the accumulator in an amount corresponding to the amount of unaffected least significant bits transferred to the buffer.

31. The method of claim 28, further comprising dequeueing bits from a buffer after accumulation of bits at the buffer permits a dequeue operation each successive cycle until the buffer has been completely dequeued of data for the operands.

32. The method of claim 27, further comprising obtaining sets of a first operand and a second operand from the same one of multiple processing units in succession based on a signal provided by the processing unit.

* * * * *